United States Patent
Cho et al.

(10) Patent No.: US 9,985,692 B2
(45) Date of Patent: May 29, 2018

(54) METHOD FOR PRELOADING CONTENT AND ELECTRONIC DEVICE SUPPORTING THE SAME

(71) Applicant: Samsung Electronics Co., Ltd., Gyeonggi-do (KR)

(72) Inventors: Kum-Hyun Cho, Gyeonggi-do (KR); Chanwon Lee, Gyeonggi-do (KR); Seunghyuk Yu, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days. days.

(21) Appl. No.: 15/368,087

(22) Filed: Dec. 2, 2016

(65) Prior Publication Data

US 2017/0163313 A1 Jun. 8, 2017

(30) Foreign Application Priority Data

Dec. 4, 2015 (KR) ........................ 10-2015-0172262

(51) Int. Cl.
*H04W 4/00* (2018.01)
*H04B 5/00* (2006.01)
*H04B 17/318* (2015.01)

(52) U.S. Cl.
CPC ......... *H04B 5/0031* (2013.01); *H04B 5/0062* (2013.01); *H04B 17/318* (2015.01); *H04W 4/008* (2013.01)

(58) Field of Classification Search
CPC .. H04B 5/0031; H04B 17/318; H04B 5/0062; H04W 4/008; H04W 28/10; G06K 19/073; G06K 7/10366; H04L 67/04; H04L 67/12
See application file for complete search history.

(56) References Cited

U.S. PATENT DOCUMENTS

| 2004/0010449 | A1 | 1/2004 | Berardi et al. |
| 2008/0297312 | A1* | 12/2008 | Moshfeghi ............ H04W 28/10 340/10.1 |
| 2017/0053317 | A1* | 2/2017 | Dione ................. G06K 7/10366 |
| 2017/0147915 | A1* | 5/2017 | Butler ................... G06K 19/073 |

* cited by examiner

Primary Examiner — Thanh Le
(74) Attorney, Agent, or Firm — The Farrell Law Firm, P.C.

(57) ABSTRACT

A method for preloading content in an electronic device is provided. The method includes receiving tag information from a tag using a radio frequency identification (RFID) module, determining a priority order of the tag based on the received tag information, and downloading content related to the tag information from an external device using a communication module based on the determined priority order of the tag.

18 Claims, 18 Drawing Sheets

US 9,985,692 B2

METHOD FOR PRELOADING CONTENT AND ELECTRONIC DEVICE SUPPORTING THE SAME

PRIORITY

This application claims priority under 35 U.S.C. § 119(a) to Korean Patent Application Serial No. 10-2015-0172262, which was filed in the Korean Intellectual Property Office on Dec. 4, 2015, the contents of which are incorporated herein by reference.

BACKGROUND

1. Field of the Disclosure

The present disclosure relates generally to an electronic device, and more particularly, to a method for preloading content and an electronic device supporting the same.

2. Description of the Related Art

Electronic devices can provide a variety of contents to users by executing applications or downloading the contents from an external device (e.g., a server) based on user inputs.

Conventional electronic devices can include radio frequency identification (RFID) modules, and can provide various services to users using the RFID modules. For example, by recognizing an RFID tag included in an external device, the electronic device can acquire information about the external device, e.g., information about a manufacturing company of the external device, a price of the external device, a description of the external device, etc. For example, while the electronic device is in communication with the external device, using the RFID module, the electronic device can perform a payment function.

SUMMARY

Aspects of the present disclosure have been made to address at least the above-mentioned problems and/or disadvantages and to provide at least the advantages described below. Accordingly, an aspect of the present disclosure provides a method for preloading content and an electronic device supporting the same, by detecting an external device (e.g., a card) including a tag located within a designated distance through an RFID module and previously downloading content related with the external device from a server.

In accordance with an aspect of the present disclosure, there is provided a method for preloading content in an electronic device. The method includes receiving tag information from a tag from among a plurality of tags using a radio frequency identification (RFID) module, determining a priority order of the tag relative to the priority of tags based on the received tag information, and downloading content related to the tag information from an external device using a communication module based on the determined priority order of the tag.

In accordance with an aspect of the present disclosure, there is provided an electronic device. The electronic device includes a communication circuit including a radio frequency identification (RFID) module and a processor configured to receive tag information from a tag from among a plurality of tags using the RFID module, determine priority order one of the tag relative to the plurality of tags based on the received tag information, and download content related to the tag information from an external device by using the communication circuit based on the determined priority order of the tag.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
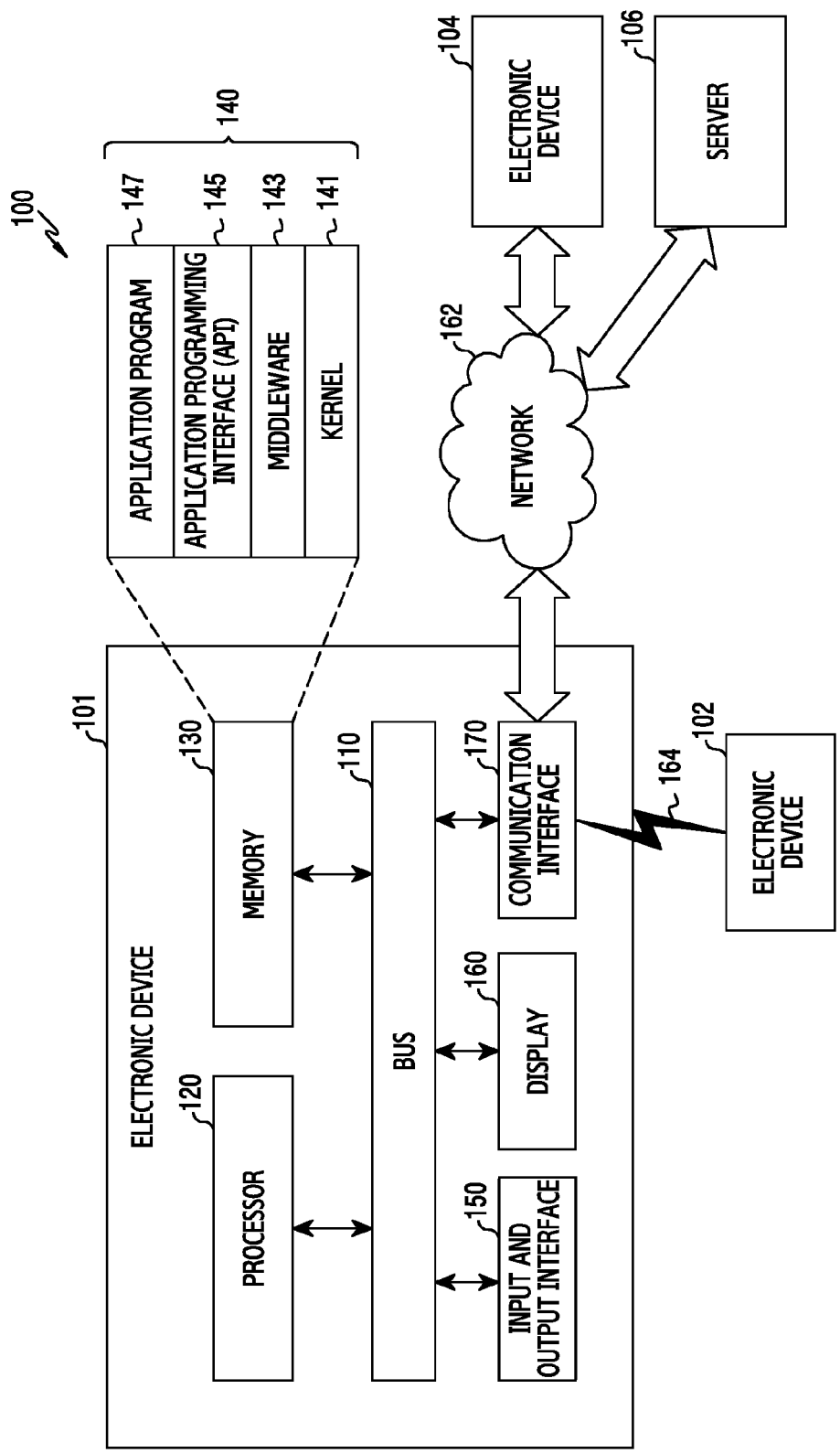
FIG. 1 illustrates a network environment including an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

Herein, the term "preloading" 'can represent an operation of, if it is a designated condition (e.g., a condition that an electronic device is located within a designated distance from a card including a tag, etc.), automatically downloading, by the electronic device, data about content from an external device (e.g., server, etc.), and previously performing an operation related with the tag (e.g., loading data from an auxiliary memory device to a main memory device, etc.).

Terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B. The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The term "module" as used herein may be defined as, for example, a unit including one of hardware, software, and firmware or two or more combinations thereof. The term "module" may be interchangeably used with, for example, the terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application-specific integrated circuit (ASIC) chip, field-programmable gate arrays (FPGAs), or a programmable-logic device, which is well known or will be developed in the future, for performing certain operations.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. The wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include at least one of various medical devices (e.g., various portable medical measurement devices (such as blood glucose meters, heart rate monitors, blood pressure monitors, or thermometers, and the like), a magnetic resonance angiography (MRA) device, a magnetic resonance imaging (MRI) device, a computed tomography (CT) device, scanners, or ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, or wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

Herein, the term "user" as used herein may refer to a person who uses an electronic device or may refer to a device (e.g., an artificial intelligence electronic device) which uses an electronic device.

FIG. 1 illustrates a network environment 100 including an electronic device 101, according to an embodiment of the present disclosure.

The electronic device 101 includes a bus 110, a processor 120, a memory 130, an input/output interface 150, a display 160, and a communication interface 170. The electronic device 101 may omit at least one of the above-mentioned components or may additionally include other components. The bus 110 may include, for example, a circuit that interconnects the above-mentioned components 110 to 170 and transmits communication (e.g., a control message or data) among the components. The processor 120 may include one or more of a central processing unit (CPU), an application processor (AP), and a communication processor (CP). The processor 120 may execute, for example, an arithmetic operation or data processing that is related to a control and/or communication of one or more other components of the electronic device 101.

The memory 130 may include a volatile memory and/or a non-volatile memory. The memory 130 may store, for example, commands or data that are related to one or more other components of the electronic device 101. The memory 130 may store software and/or a program 140.

The program 140 may include, for example, a kernel 141, a middleware 143, an application programming interface (API) 145, and/or an application program (or an "application") 147. At least one of the kernel 141, the middleware 143, and the API 145 may be referred to as an operating system (OS). The kernel 141 may control or manage, for example, system resources (e.g., the bus 110, the processor 120, or the memory 130) that are used for executing operations or functions implemented in the other programs (e.g., the middleware 143, the API 145, or the application programs 147). In addition, the kernel 141 may provide an interface that allows the middleware 143, the API 145, or the application programs 147 to access individual components of the electronic device 101 so as to control or manage the system resources.

The middleware 143 may play an intermediary role such that, for example, the API 145 or the application programs 147 may communicate with the kernel 141 so as to exchange data. In addition, the middleware 143 may process one or more task requests which are received from the application programs 147, according to priority. For example, the middleware 143 may assign the priority to be capable of using a system resource of the electronic device 101 (e.g., the bus 110, the processor 120, or the memory 130) to at least one of the application programs 147, and may process the one or more task requests. The API 145 is, for example, an interface that allows the applications 147 to control functions provided from the kernel 141 or the middleware 143, and may include, for example, one or more interfaces or functions (e.g., commands) for a file control, a window control, an image processing, or a character control. The input/output interface 150 may transmit commands or data, which are entered from, for example, a user or any other external device, to the other component(s) of the electronic device 101, or may output commands or data, which are received from the other component(s) of the electronic device 101, to the user or the other external device.

The display device 160 may include, for example, a liquid crystal display (LCD), a light emitting diode (LED) display, an organic light emitting diode (OLED) display, a microelectromechanical system (MEMS), or an electronic paper display. The display 160 may display various contents (e.g., text, image, video, icon, or symbol) to, for example, the user. The display 160 may include a touch screen, and may receive a touch input, a gesture input, a proximity input, or a hovering input that is made using, for example, an electronic pen or a part of the user's body.

The communication interface 170 may set, for example, communication between the electronic device 101 and a first external electronic device 102, a second external device 104, or a server 106. For example, the communication interface 170 may be connected with a network 162 through wired or wireless communication so as to communicate with the second external electronic device 104 or the server 106.

The wireless communication may include a cellular communication that uses at least one of, for example, long-term evolution (LTE), LTE advance (LTE-A), code division multiple access (CDMA), wideband CDMA (WCDMA), universal mobile telecommunication system (UMTS), wireless broadband (WiBro), and global system for mobile communication (GSM). The wireless communication may include at least one of, for example, wireless-fidelity (WiFi), bluetooth (BT), ZigBee, near field communication (NFC), magnetic stripe transmission (MST), magnetic secure transmission, radio frequency (RF), and body area network (BAN). The MST may generate pulses according to transmission data using an electromagnetic signal, and the pulses may generate a magnetic field signal. The electronic device 101 may transmit the magnetic field signal to a POS device, and the POS may detect the magnetic field signal using an MST reader and may convert the detected the magnetic field signal into an electric signal so as to recover the data.

The wireless communication may include GNSS. The GNSS may be, for example, global positioning system (GPS), global navigation satellite system (Glonass), Beidou navigation satellite system (hereinafter, "Beidou"), Galileo, or the European global satellite-based navigation system. Herein, "GPS" may be interchangeably used with "GNSS" below. The wired communication may use at least one of, for example, universal serial bus (USB), high definition multimedia interface (HDMI), recommended standard 232 (RS-232), and plain old telephone service (POTS).

The wired communication may be implemented through an electric connection between a connector embedded in the electronic device 101 and an external connector embedded in the electronic device 120. For example, the electronic device 101 may identify the external electronic device 102 connected through the connector. The electronic device 101 may execute various operation flows for controlling signal transmission/reception with the identified external device 102. The electronic device 101 may receive at least one of an analog signal, a digital signal, and a power source (or power) signal) from the external electronic device 102, or may transmit such a signal to the external electronic device 102.

The communication interface 170 may support various types of communication standards related to a connector. For example, the communication interface 170 may support USB 3.x.

The processor 120 may execute various operation flows depending on whether the connector of the electronic device 101 and the external connector of the external electronic device 102 are connected to each other. The processor 120 may execute switching between operation flows depending on whether the connector of the electronic device 101 and the external connector of the external electronic device 102 are connected to each other. The processor 120 may execute control flows related to the connectors or other electronic parts depending on whether the connector of the electronic device 101 and the external connector of the external electronic device 102 are connected to each other.

The communication interface 170 may include a receptacle that is connectable to an external connector, a ground member that is electrically connected to the receptacle, and a control circuit. The receptacle may include a shell that is capable of accommodating the external connector, a tongue that is located in a space of the shell and enclosed by the shell, and at least one first contact that is coupled to the tongue and electrically connected to the ground member. In addition, the receptacle may include at least one second contact that is coupled to the tongue and electrically connected to the control circuit. In addition, the receptacle may include at least one third contact that is formed at least a portion of a conductive member included in the tongue and electrically connected to the control circuit. The first contact may be designed to be electrically conducted to the external connector earlier than the third contact when the external connector is inserted into the receptacle. For example, the first contact may have a length that further extends in a direction where the external connector is separated from the receptacle, compared to the third contact. The first contact may be designed to be electrically conducted to the external connector earlier than the second contact when the external connector is inserted into the receptacle. For example, the first contact may have a length that further extends in a direction where the external connector is separated from the receptacle, compared to the second contact. Such a connection structure may reduce an influence caused by a harmful component because a ground connection between the connectors is formed first when the external connector of the external electronic device 102 is connected to the connector of the electronic device 101.

The network 162 may include a telecommunication network (e.g., a computer network (e.g., LAN or WAN), the internet, or a telephone network).

Each of the first and second external electronic devices 102 and 104 may be a type of device that is the same as or different from the electronic device 101. All or some of the operations to be executed by the electronic device 101 may be executed by the electronic devices 102 and 104 or the server 106. In the case where the electronic device 101 should perform a certain function or service automatically or by a request, the electronic device 101 may request some functions or services that are associated therewith from the electronic devices 102 and 104 or the server 106, instead of or in addition to executing the functions or service by itself. The electronic devices 102 and 104 or the server 106 may execute the requested functions or additional functions, and may deliver the results to the electronic device 101. The electronic device 101 may provide the requested functions or services by processing the received results as they are or additionally. For this purpose, for example, a cloud computing technique, a distributed computing technique, or a client-server computing technique may be used.

Figure 2:
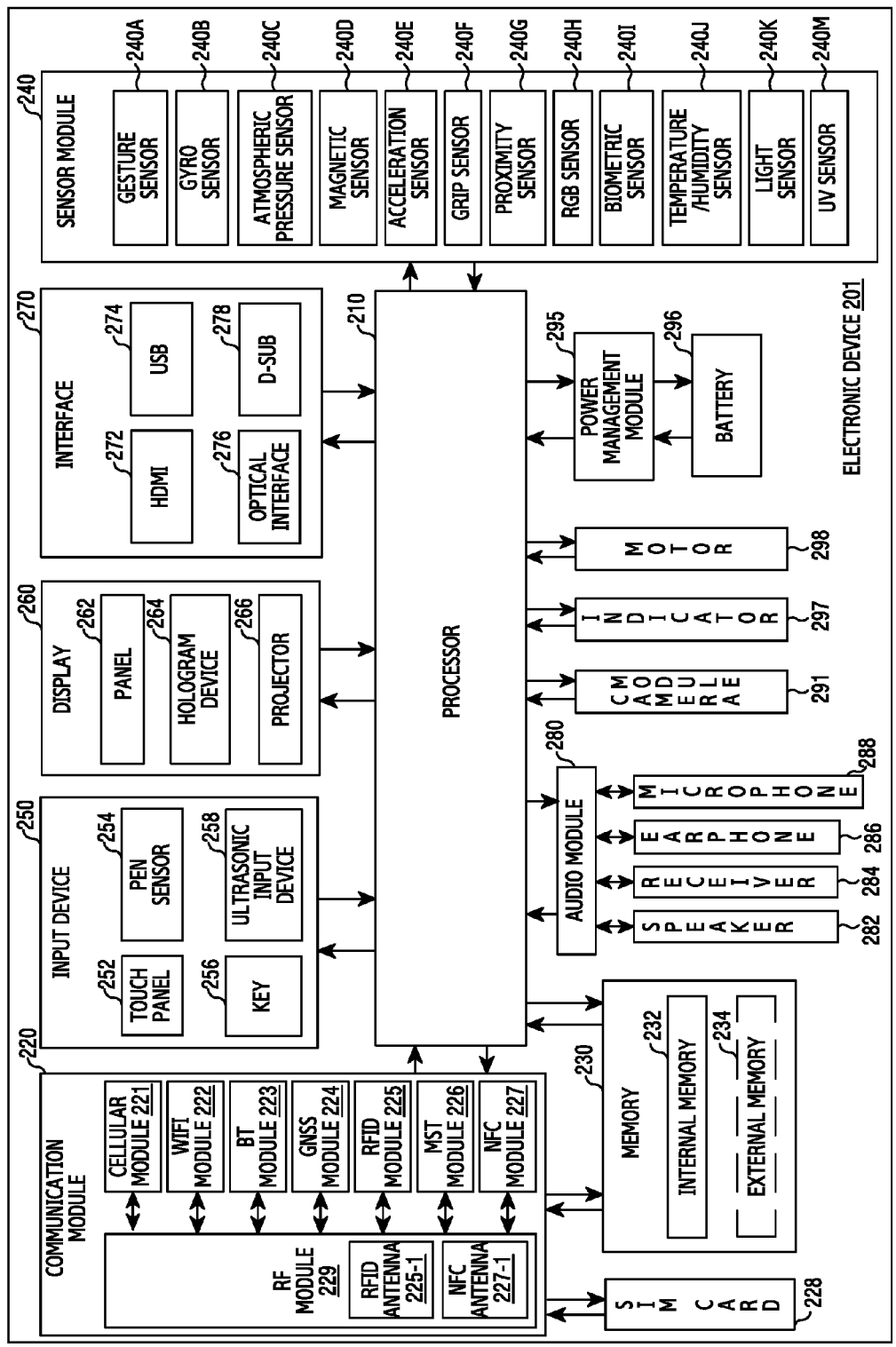
FIG. 2 illustrates a block diagram of an electronic device, according to an embodiment of the present disclosure.

FIG. 2 is a block diagram of an electronic device 201, according to an embodiment of the present disclosure.

The electronic device 201 may include, for example, some or all of components of the electronic device 101 illustrated in FIG. 1. The electronic device 201 includes at least one processor (e.g., an Application Processor (AP)) 210, a communication module 220, a subscriber identification module (SIM) or card 228, a memory 230, a sensor module 240, an input device 250, a display 260, an interface 270, an audio module 280, a camera module 291, a power management module 295, a battery 296, an indicator 297, and a motor 298.

The AP 210 may drive, for example, an OS or an application program so as to control a plurality of hardware or software components connected thereto, and may also perform various data processing and arithmetic operations. The processor 210 may be implemented by, for example, a system-on-chip (SoC). The AP 210 may further include a graphic processing unit (GPU) and/or an image signal processor. The AP 210 may include at least some components (e.g., the cellular module 221) among the components illustrated in FIG. 2. The processor 210 may load a command or data received from at least one of the other components (e.g., a non-volatile memory) in a volatile memory so as to process the command and data, and may store result data in a non-volatile memory.

The communication module 220 may have a configuration that is the same as or similar to the communication interface 170. The communication module 220 may include, for example, the cellular module 221, a WiFi module 222, a BT module 223, a GNSS module 224, an NFC module 225, an MST module 226, and an RF module 229. The cellular module 221 may provide, for example, a voice call, a video call, a message service, or an internet service through a communication network. The cellular module 221 may perform discrimination and authentication of the electronic device 201 within the communication network by using the SIM 228. The cellular module 221 may perform at least some of the multimedia control functions that may be provided by the AP 210. The cellular module 221 may include a CP. At least some (e.g., two or more) of the cellular module 221, the WiFi module 222, the BT module 223, the GNSS module 224, the RFID module 225, the MST module 226 and/or the NFC module 227 can be included within one Integrated Chip (IC) or IC package.

The RFID module 225 can read tag information received using an RFID antenna 225-1, and forward the tag information to the processor 210. The RFID module 225 can control a scan operation for searching at least one tag located around the electronic device 201. For example, the RFID module 225 can control a scan operation for searching at least one tag located at a relatively long distance (e.g., within 100 meter (m)) from the electronic device 201.

The NFC module 227 can read tag information received using an NFC antenna 227-1, and forward the tag information to the processor 210. The NFC module 227 can control a scan operation for searching at least one tag located around the electronic device 201. For example, the NFC module 227 can control a scan operation for searching at least one tag located at a relatively close distance (e.g., within approximately 10 centimeter (cm)) from the electronic device 201.

A distance at which the RFID module 225 or the NFC module 227 can recognize a tag can be varied according to a shape of the RFID antenna (or RFID antenna pattern) 225-1 or the NFC antenna (or NFC antenna pattern) 227-1, for example, a length of the antenna, a form thereof, etc.

In FIG. 2, it is illustrated that the RFID module 225 and the NFC module 227 are constructed as separate components, but they can be constructed as one integrated module.

The RF module 229 can, for example, transceive a communication signal (e.g., RF signal). The RF module 229 can, for example, include a transceiver, a power amplifier module (PAM), a frequency filter, a low noise amplifier (LNA), an antenna, etc. At least one of the cellular module 221, the WiFi module 222, the BT module 223, the RFID module 225, the MST module 226, or the NFC module 226 can transceive an RF signal through a separate RF module.

The RF module 229 can include the RFID antenna 225-1, the NFC antenna 227-1, etc. The RFID antenna 225-1 can receive tag information from at least one tag located at a relatively long distance (e.g., within approximately 100 m). The RFID antenna 225-1 can support frequency bands of 135 KHz, 13.56 MHz, 430 MHz, 860 MHz to 960 MHz, or 2.45 MHz.

The NFC antenna 227-1 can receive tag information from at least one tag located at a relatively close distance (e.g., within 10 cm). The NFC antenna 227-1 can support a frequency band 13.56 MHz. The NFC antenna 227-1 can be implemented to recognize that a card including a tag is installed in the electronic device 201. For example, the NFC antenna 227-1 can be implemented to recognize a tag being at a very close distance (e.g., approximately 1 cm). Though not illustrated in FIG. 2, the NFC antenna 227-1 can be included (or installed) in a shield case of the electronic device 201. In a case where a card including a tag is installed in the electronic device 201, the shield case can prevent the NFC antenna 227-1 from recognizing other card than the installed card. In a case where the card including the tag is installed in the electronic device 201, the shield case can prevent the installed card (or the tag included in the card) from being recognized by another electronic device.

The RFID antenna 225-1 and the NFC antenna 227-1 can support the same frequency band. For example, the RFID antenna 225-1 and the NFC antenna 227-1 can be implemented to support a frequency band 13.56 MHz. In a case where the RFID antenna 225-1 and the NFC antenna 227-1 are implemented to support the same frequency band, a tag included in a card can transmit tag information to the RFID antenna 225-1 and the NFC antenna 227-1, using one antenna (or antenna pattern) supporting the same frequency band; however, the present disclosure is not so limited.

The SIM 228 may be an embedded SIM, and may also include intrinsic identification information (e.g., integrated circuit card identifier (ICCID)) or subscriber information (e.g., international mobile subscriber identity (IMSI)).

The memory 230 may include, for example, an internal memory 232 or an external memory 234. The internal memory 232 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 2234 may further include a flash drive, for example, a compact flash (CF), a secure digital (SD), a micro-SD, a mini-SD, an extreme digital (xD), or a memory stick, and the like. The external memory 2234 may functionally and/or physically connect with the electronic device 2201 through various interfaces.

The sensor module 240 may measure a physical quantity or may sense an operating status of the electronic device 201, and may then convert the measured or sensed information into electric signals. The sensor module 240 may include at least one of, for example, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, blue (RGB) ( ) sensor), a biometric sensor 240I, a temperature/humidity sensor 240J, an illuminance sensor 240K, and an ultra-violet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infra-red (IR) sensor, an iris sensor, and/or a fingerprint sensor. The sensor module 240 may further include a control circuit for controlling one or more sensors incorporated therein. The electronic device 201 may further include a processor configured to control the sensor module 240 as a part of the AP 210 or separate from the AP 210 so as to control the sensor module 240 while the AP 210 is in the sleep state.

The input device 250 may include, for example, a touch panel 252, a (digital) pen sensor 254, a key 256, or an ultrasonic input device 258. The touch panel 252 may recognize a touch input using at least one of, for example, a capacitive detecting method, a resistive detecting method, an infrared detecting method, or an ultrasonic detecting method. Also, the touch panel 252 may further include a control circuit. The touch panel 252 may further include a tactile layer and may provide a tactile reaction to a user.

The (digital) pen sensor 254 may be, for example, a portion of the touch panel, or may include a separate recognition sheet. The key 256 may include, for example, a physical button, an optical key, or a keypad. The ultrasonic input device 258 may sense, through a microphone 288, ultrasonic waves generated by an input tool so as to confirm data corresponding to the sensed ultrasonic waves.

The display 260 may include a panel 262, a hologram device 264, a projector 266, and/or a control circuit for controlling these components. The panel 262 may be implemented to be, for example, flexible, transparent, or wearable. The panel 262 may be constituted with the touch panel 252 and one or more modules. The hologram device 264 may show a stereoscopic image in the air using interference of light. The projector 266 may project light onto a screen so as to display an image. The screen may be located, for example, inside or outside the electronic device 201. The interface 270 may include, for example, an HDMI 272, a USB 274, an optical interface 276, or a d-subminiature (D-sub) 278. For example, the interface 270 may be included in the communication interface 170 illustrated in FIG. 1. Additionally or alternatively, the interface 270 may include, for example, a mobile high-definition link (MHL) interface, an SD card/multi-media card (MMC) interface, or an infrared data association (IrDA) standard interface.

The interface 280 may include a receptacle. The receptacle may include a shell that is capable of accommodating the external connector, a tongue that is located in a space of the shell and enclosed by the shell, and at least one first contact that is coupled to the tongue and electrically connected to the ground member. In addition, the receptacle may include at least one second contact that is coupled to the tongue and electrically connected to the control circuit. In addition, the receptacle may include at least one third contact that is formed at least a portion of a conductive member included in the tongue and electrically connected to the control circuit. The first contact may be designed to be electrically conducted to the external connector earlier than the third contact when the external connector is inserted into the receptacle. For example, the first contact may have a length that further extends in a direction where the external connector is separated from the receptacle, compared to the third contact. The first contact may be designed to be electrically conducted to the external connector earlier than the second contact when the external connector is inserted into the receptacle. The first contact may have a length that further extends in a direction where the external connector is separated from the receptacle, compared to the second contact. Such a connection structure may reduce an influence caused by a harmful component since a ground connection between the connectors is formed first when the external connector of the external electronic device is connected to the connector of the electronic device 201.

The audio module 280 may bi-directionally convert, for example, sound and electric signals. At least some of the components of the audio module 280 may be included in, for example, the input/output interface 145 illustrated in FIG. 1. The audio module 280 may process sound information input or output through, for example, a speaker 282, a receiver 284, an earphone 286, or the microphone 288.

The camera module 291 is a device that is capable of photographing, for example, a still image and a video image, and the camera module 291 may include at least one image sensor (e.g., a front sensor or a rear sensor), a lens, an image signal processor (ISP), or a flash (e.g., an LED or a xenon lamp).

The power management module 295 may manage, for example, the electric power of the electronic device 201. The power management module 295 may include a power management integrated circuit (PMIC), a charger integrated circuit (IC), or a battery or gauge. The PMIC may be configured in a wired and/or wireless charge type. The wireless charge type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the residual capacity of the battery 296, and a voltage, a current, or a temperature during the charge. The battery 296 may include, for example, a rechargeable battery and/or a solar battery.

The indicator 297 may indicate a specific status (e.g., a booting status, a message status, or a charged status) of the electronic device 201 or of a part thereof (e.g., AP 210). The motor 298 may convert an electric signal into a mechanical vibration, and may generate, for example, a vibration or a haptic effect. The electronic device 201 may include, for example, a mobile TV support device (e.g., a GPU) that is capable of processing media data according to a standard of, for example, digital multimedia broadcasting (DMB), digital video broadcasting (DVB), or MediaFlo™.

Each of the components described herein may be constituted with one or more components, and the names of the corresponding components may vary depending on a type of an electronic device. The electronic device 201 may not include some of the components, or may include an additional component. Some of the components can be combined with each other to constitute one object and to similarly perform the functions of the corresponding components prior to the combination.

Figure 3:
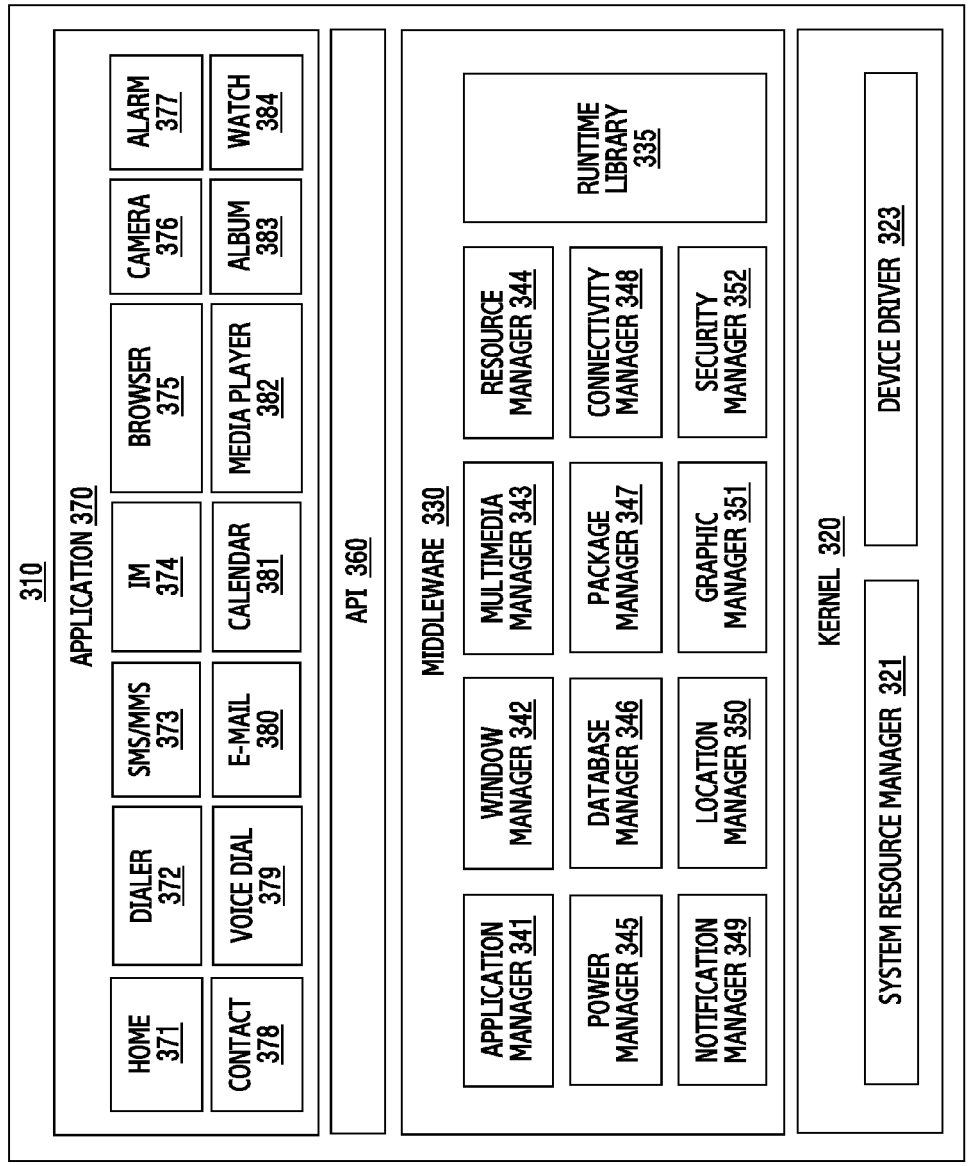
FIG. 3 is a block diagram of a program module, according to an embodiment of the present disclosure.

FIG. 3 is a block diagram illustrating a program module 310, according to an embodiment of the present disclosure.

The program module 310 may include an OS that controls resources associated with the electronic device 101 and/or various applications (e.g., the application program 147) that are driven on the OS. The OS may include, for example, Android™, iOS™, Windows™, Symbian™, Tizen™, or Bada™. Referring to FIG. 3, the program module 310 includes a kernel 320, a middleware 330, an API 360, and/or an application 370. At least a part of the program module 310 may be preloaded on the electronic device, or may be downloaded from the device 102 or 104, or the server 106.

The kernel 320 includes, a system resource manager 321 and/or a device driver 323. The system resource manager 321 may perform, a control, allocation, or recovery of a system resource. The system resource manager 321 may include, a process management unit, a memory management unit, or a file system management unit. The device driver 323 may include, a display driver, a camera driver, a BT driver, a common memory driver, a USB driver, a keypad driver, a WiFi driver, an audio driver, or an inter-process Communication (IPC) driver. The middleware 330 may provide, a function that is commonly required by the applications 370, or may provide various functions to the applications 370 through the API 360 such that the applications 370 can efficiently use the limited system resources within the electronic device. The middleware 330 includes a runtime library 335, an application manager 341, a window manager 342, a multimedia manager 343, a resource manager 344, a power manager 345, a database manager 346, a package manager 347, a connectivity manager 348, a notification manager 349, a location manger 350, a graphic manager 351, and a security manager 352.

The runtime library 335 may include, a library module that is used by a compiler in order to add a new function through a program language while the applications 370 are executed. The runtime library 335 may perform, input/output management, memory management, or processing of an arithmetic function. The application manager 341 may manage, a life cycle of the applications 370. The window manager 342 may manage a GUI resource that is used in a screen. The multimedia manager 343 may identify a format required for reproducing various media files, and may perform encoding or decoding of the media files by using a codec that is suitable for the corresponding format. The application manager 344 may manage a source code of the applications 370 or a memory space. The power manager 345 may manage a battery capacity or power, and may provide power information required for operating the electronic device. The power manager 345 may be interlocked with a basic input/output system (BIOS). The database manager 346 may generate, retrieve, or change, a database to be used by the applications 370. The package manager 347 may manage the installation or update of an application that is distributed in the form of a package file.

The connectivity manager 348 may manage, a wireless connection. The notification manager 349 may provide, to the user, events of, for example, arrival massage, promise, and or proximity notification. The location manager 350 may manage, position information of the electronic device. The graphic manager 351 may manage a graphic effect to be provided to the user or a user interface associated therewith. The security manager 352 may provide, system security or user authentication. According to one embodiment, the middleware 330 may include a telephony manager that manages a voice or video call function of the electronic device or a middleware module that may combine the functions of the above-described components. The middleware 330 may provide a module that is specialized for each kind of OS. The middleware 330 may dynamically delete some of the existing components or add new components. The API 360 is, for example, a collection of API programming functions, and may be provided in different configurations depending on operation systems. For example, Android™ or iOS™ may provide one API set for each platform, and Tizen™ may provide two or more API sets for each platform.

The applications 370 may include a home application 371, a dialer application 372, an SMS/MMS 373, an instant message (IM) application 374, a browser application 375, a camera application 376, an alarm application 377, a contact application 378, a voice dial application 379, an e-mail application 380, a calendar application 381, a media player application 382, an album application 383, and a watch application 384. Additionally, the applications 370 may include a health care information application (e.g., an application for measurement of a quantity of motion, or blood sugar), or environmental information application (e.g., an application for atmospheric pressure, humidity, or temperature information). The applications 370 may include an information exchange application that supports information exchange between the electronic device and an external electronic device. The information exchange application may include, a notification relay application to transmit specific information to the external electronic devices, or a device management application to manage the external electronic devices. For example, the notification relay application may relay notification information generated by another application of the electronic device, or may receive notification from an external electronic device and may provide the notification information to the user. The device management application may, install, delete, or update a function of an external electronic device that communicates with the electronic device (e.g., turn-on/turn-off of the external electronic device itself (or some components thereof) or adjustment of brightness (or resolution) of a display), or an application operated in the external electronic device. The applications 370 may include an application designated according to an attribute of an external electronic device (e.g., a healthcare application of a mobile medical device). The applications 370 may include an application received from an external electronic device. At least a part of the program module 310 may be implemented (e.g., executed) by software, firmware, hardware (e.g., the processor 210), or a combination of at least two of them, and may include a module, a program, a routine, a command set, or a process for performing one or more functions.

An electronic device according to an embodiments of the present disclosure can include a communication circuit including a radio frequency identification (RFID) module, and a processor. The processor can be set to receive at least one piece of tag information from at least one tag, using the RFID module, determine priority order between the at least one tag, based at least on the received at least one piece of tag information, and download content related with the at least one piece of tag information from an external device by using the communication circuit, based on the determined priority order.

The at least one tag can be each included in a card, and the card can be installable in the electronic device.

The processor can determine the priority order in accordance with an intensity of a signal received from the at least one tag, or situation information of the electronic device. In one exemplary embodiment, in case where at least one card including the at least one tag is installed in the electronic device, the processor can determine the priority order in accordance with a degree of association with the installed at least one card.

When a card including the at least one tag is uninstalled from the electronic device in a state in which the at least one card is installed in the electronic device, the processor can determine the priority order in accordance with a degree of association with the uninstalled at least one card.

While downloading the content related with the at least one piece of tag information, the processor can output content related with the at least one tag, or allocate a resource for performing the downloading operation in accordance with the determined priority order.

The processor can perform, by the electronic device installing a 1st card, a linkage function with at least one another electronic device installing a 2nd card, receive information about content related with the 2nd card from the at least one another electronic device, using the RFID module, in order to perform the linkage function, and perform an operation for previously performing a function in which content related with the 1st card and the content related with the 2nd card are linked with each other.

The processor can perform, by the electronic device, Near Field Communication (NFC) communication connection with at least one electronic device among the at least one another electronic device, using an NFC communication module, and perform the linkage function, based at least on the operation of previously performing the linkage function.

When the content includes content related with a character, the linkage function can include a function of outputting content related with a character combining a character related with the 1st card and a character related with the 2nd card, or content including the character related with the 1st card and the character related with the 2nd card.

When the content includes content related with an instrument, the linkage function can include a function of outputting a combination of a sound source of an instrument related with the 1st card and a sound source of an instrument related with the 2nd card.

Figure 4A:
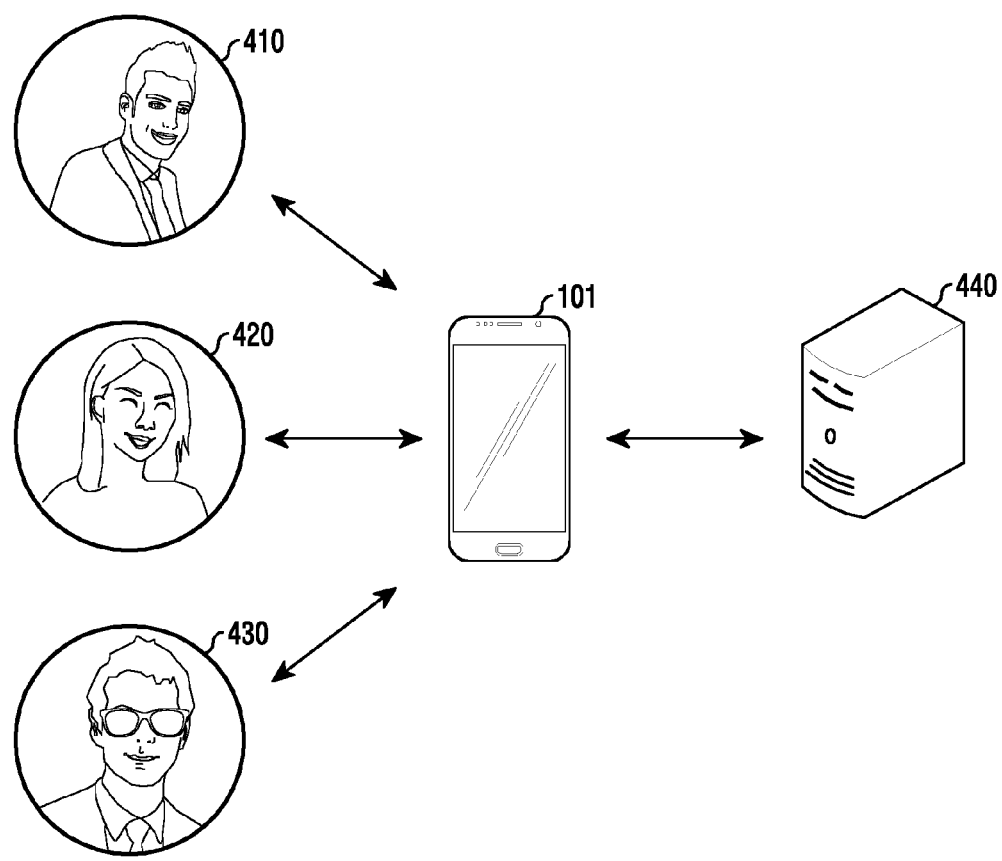
FIGS. 4A and 4B are diagrams illustrating a method for preloading content, according to an embodiment of the present disclosure.
Figure 4B:
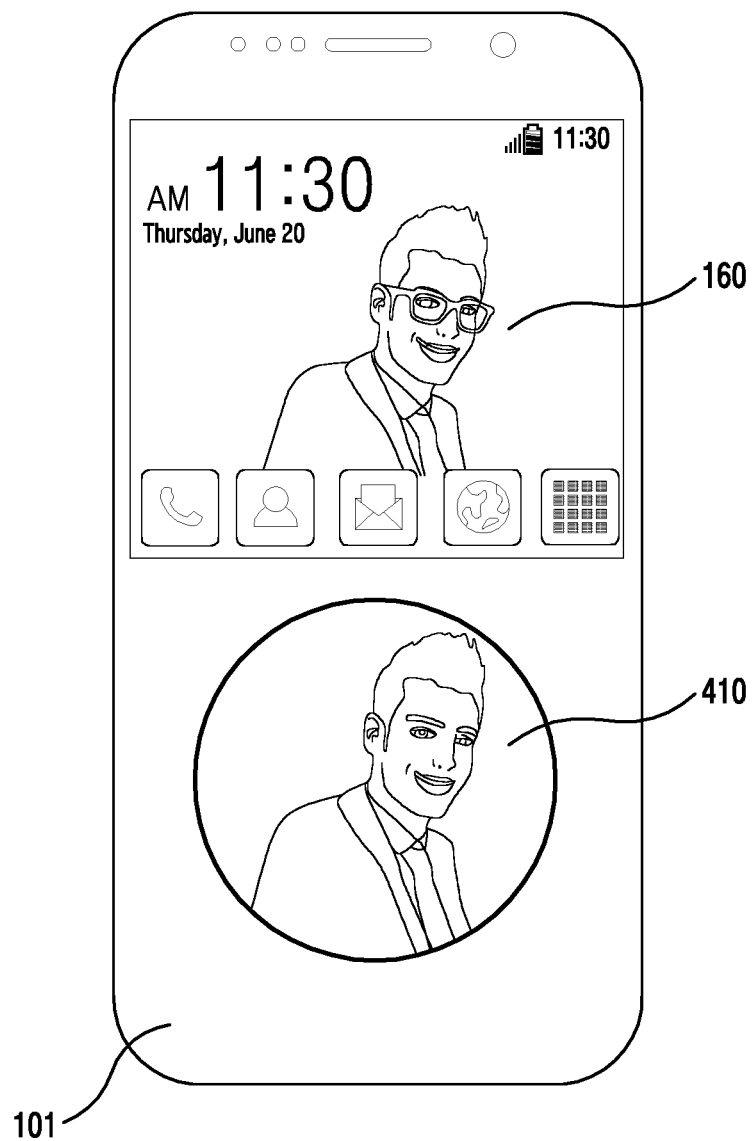

FIGS. 4A and 4B are diagrams of a method for preloading content, according to an embodiment of the present disclosure.

Referring to FIG. 4A and FIG. 4B, the electronic device 101 can search cards 410, 420 or 430 located within a designated distance from the electronic device 101, and receive tag information from the searched cards 410, 420 or 430 including a tag. The electronic device 101 can include the RFID module 225, the RFID antenna 225-1, etc., and the electronic device 101 can receive at least one piece of tag information from the card 410, 420 or 430 including the tag, through the RFID antenna 225-1.

The tag information can include a unique ID of a card (or tag). The tag information can include information about a service (or item) provided through a tag, the type of the service, a manufacturing company of the service, etc., in addition to the unique identification of the card. The tag information can include information about the term of validity of data, a name of the data, a description of the data, a price of the data, a uniform resource locator (URL) of the data, and a uniform resource name (URN) of the data; however, the information included in the tag information is not limited to this.

If receiving at least one piece of tag information from cards 410, 420 or 430, the electronic device 101 can send a request for content related with the at least one piece of tag information to an external device 440 (e.g., server), and download the content from the external device 440. The electronic device 101 can check the at least one piece of tag information received from the cards 410, 420 or 430 and, if the content related with the checked at least one piece of tag information has not been stored in the memory 130, the electronic device 101 can send the request for the content related with the at least one piece of tag information to the external device 440. The electronic device 101 can check the at least one piece of tag information received from the cards 410, 420 or 430 and, if the content related with the checked at least one piece of tag information has been stored in the memory 130, the electronic device 101 may not send the request for the content related with the at least one piece of tag information to the external device 440.

The electronic device 101 can determine the priority order of the cards 410, 420 or 430, based at least on at least one piece of tag information received from the cards 410, 420 or 430. The electronic device 101 can control an operation of, in accordance with the priority order, sending a request for content related with the at least one piece of tag information to the external device 440 and downloading the requested content from the external device 440.

The electronic device 101 can determine the priority order of the cards 410, 420 or 430, based at least on an intensity of a signal received from an RFID tag included in each of the cards 410, 420 or 430. In a case where the cards 410 420 or 430 is installed in the electronic device 101, the electronic device 101 can determine the priority order of the cards 410, 420 or 430 in accordance with a degree of association with the cards 410, 420 or 430 installed in the electronic device 101. In a case where the cards 410 420 or 430 is uninstalled from the electronic device 101, the electronic device 101 can determine the priority order of the cards 410, 420 or 430 in accordance with a degree of association with the uninstalled at least one device. The electronic device 101 can determine the priority order of the cards 410, 420 or 430 in accordance with situation information of the electronic device 101.

While downloading content related with at least one piece of tag information from the external device 440, the electronic device 101 can output content related with at least one card. For example, while downloading the content, the electronic device 101 can output a representative image or animation related with cards 410, 420 or 430, and/or the electronic device 101 can output a vibration using the motor 298 or output light using the optical interface 276. The content, such as the image or animation outputted during the download, can be a part of the downloaded content. For example, the image or animation outputted during the download can be content which corresponds to the first image (e.g., I-frame) downloaded from the external device 440 or a part of the animation downloaded from the external device 440. When the electronic device 101 is outputting content, e.g., content according to the execution of an application stored in the electronic device 101, the electronic device 101 can output content outputted during download, to a partial region of the display 160. Content such as an image, an animation, etc. outputted during download can be an image or animation previously stored in the electronic device 101.

While downloading content related with at least one piece of tag information from the external device 440, the electronic device 101 can output a notification for notifying that the downloading of the content related with the at least one piece of tag information is ongoing. For example, while downloading the at least one piece of tag information from the external device 440, the electronic device 101 can output a text, an image, etc. for notifying that the downloading of the content is ongoing.

The external device 440 can receive a request for content related with at least one piece of tag information from the electronic device 101, and transmit the requested content to the electronic device 101. The external device 440 can include at least one server for providing content. For example, the external device 440 can include a server for providing content corresponding to a unique identification of a card (or tag), and at least one server among a plurality of servers for providing content of a corresponding type (or category). The external device 440 can further include a service provider server, etc. for providing content of a service provider to a content provision server, by communicating with the content provision server. However, it is not limited to this. For example, the external device 440 can further include a proxy server, etc.

When card 410, 420 or 430 is installed in the electronic device 101, the electronic device 101 can output content related with the installed card 410, 420 or 430. For example, if the card 410 is installed in the electronic device 101 as illustrated in FIG. 4B, the electronic device 101 can change a user interface (UI) or user experience (UX) of the display 160, using content related with the card 410. For example, if the card 410 is installed in the electronic device 101, the electronic device 101 can change a theme, an icon, etc. of a screen that is being displayed, using content (or downloaded content) related with the card 410. If the card 410 is installed in the electronic device 101, the electronic device 101 can execute a game, etc., using content downloaded from the external device 440. For example, the electronic device 101 can execute various contents downloaded from the external device 440.

The electronic device 101 can further include the NFC module 227 for detecting card 410, 420 or 430 that is installed in the electronic device 101. For example, the electronic device 101 can detect the card 410, 420 or 430 that is installed in the electronic device 101, by recognizing that the card 410, 420 or 430 is located within a designated distance through the NFC module 227. A recognizable distance of the NFC module 227 can be implemented differently in accordance with a form (e.g., a length, a shape, etc.) of the NFC antenna 227 (or NFC antenna pattern).

The electronic device 101 can detect that card 410, 420 or 430 is installed in the electronic device 101, by detecting that the card 410, 420 or 430 is in contact with the electronic device 101. For example, the electronic device 101 can detect that the card 410, 420 or 430 is installed in the electronic device 101, by detecting a contact between a tag pattern (or a tag antenna pattern) included in the card 410, 420 or 430 and a metallic contact terminal (e.g., a contact C-clip) included in the electronic device 101.

While FIG. 4A illustrates a circle form as a form of card 410, 420 or 430, the card form can be implemented as various forms including a polygonal form such as a square, etc.

FIGS. 5A-5D are diagrams illustrating electronic devices implemented in various types of card locking structures, according to an embodiment of the present disclosure.

Figures 5A, 5B:
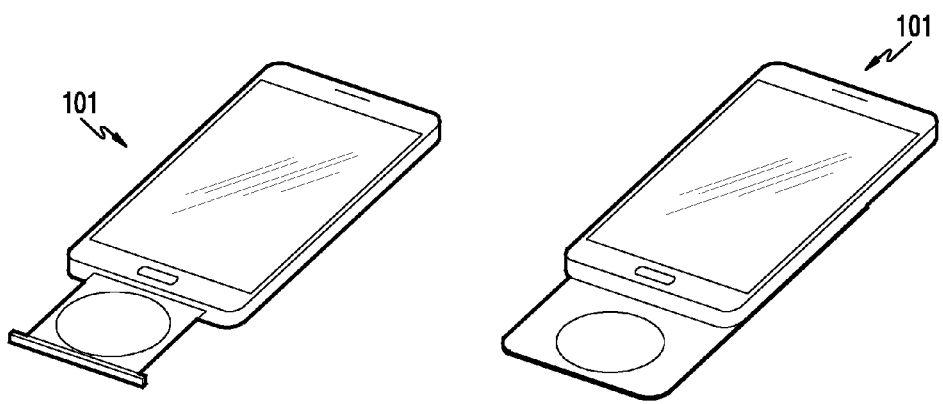
FIGS. 5A-5D are diagrams illustrating electronic devices implemented in various types of card locking structures, according to an embodiment of the present disclosure.

Referring to FIG. 5A to FIG. 5D, a card can be installed in the electronic device 101 in various manners, e.g., by positioning the card outside the electronic device 101 or by inserting the card inside the electronic device 101. As illustrated in FIG. 5A, the electronic device 101 can install a card in a slide scheme of a compact disc-read only memory (CD-ROM) form. FIG. 5A illustrates a card locking structure for the card to slide in a vertical or horizontal direction of the electronic device 101. For example, the electronic device 101 can be implemented in a structure having a card locking part possible for the card to slide to a lateral bezel part.

As illustrated in FIG. 5B, in a case where the electronic device 101 includes two bodies in the slide scheme, the electronic device 101 can install a card in any one of the two bodies.

Figures 5C, 5D:
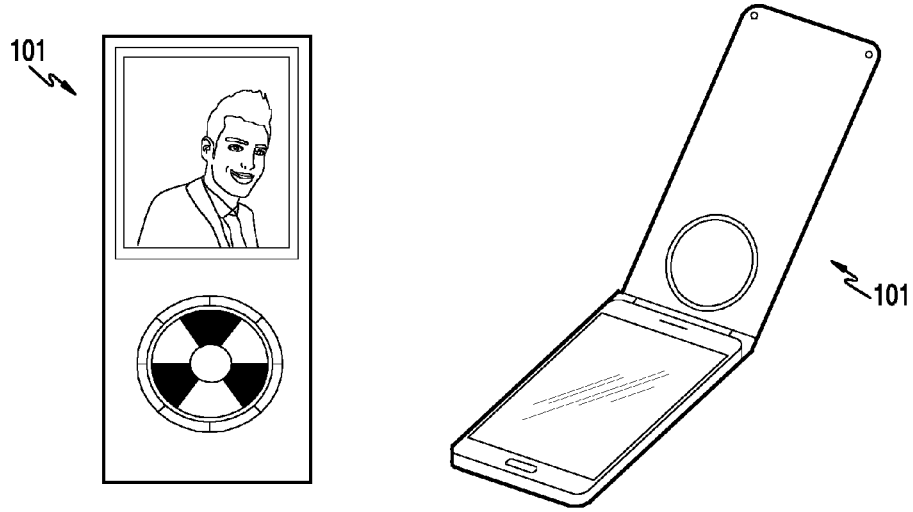

As illustrated in FIG. 5C, the electronic device 101 can install a card in a housing of the electronic device 101 or at least a part of the display 160.

As illustrated in FIG. 5D, the electronic device 101 can install a card in a cover (e.g., flip cover) of the electronic device 101. For example, the card can be inserted into a front surface or rear surface of the cover of the electronic device 101.

While FIGS. 5A-5D illustrate a single card that can be installed in the electronic device 101, two or more cards can be installed on the electronic device 101.

Figure 6:
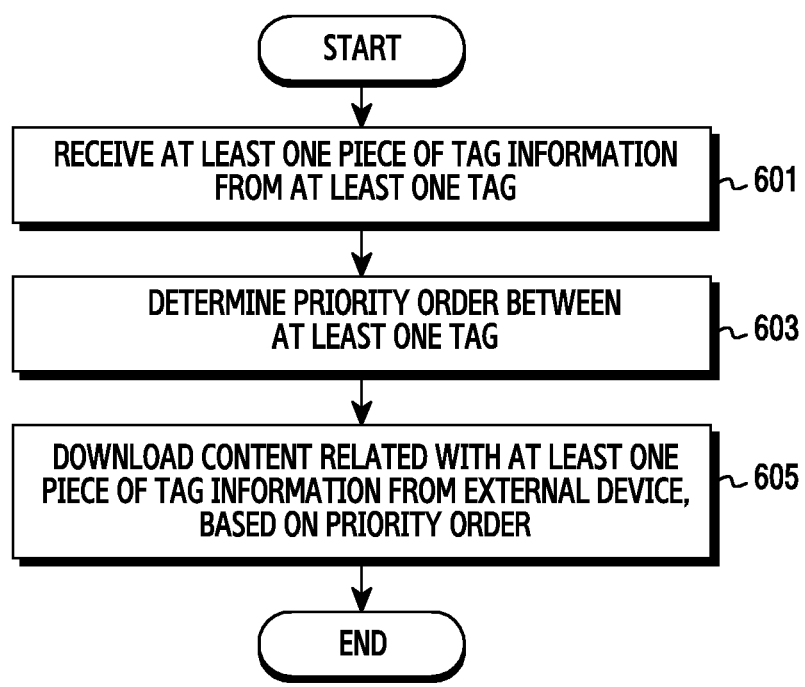
FIG. 6 is a flowchart of a method for preloading content, according to an embodiment of the present disclosure.

FIG. 6 is a flowchart of a method for preloading content, according to an embodiment of the present disclosure.

As used herein, 'preloading' can be an operation of, if it is a designated condition (e.g., a condition that the electronic device 101 is located within a designated distance from a card including a tag, etc.), automatically downloading, by the electronic device 101, data about content from an external device (e.g., server, etc.), and performing an operation related with the tag that was previously performed by the electronic device 101 (e.g., loading data from a hard disc to a RAM, etc.). The preloading can represent an operation of previously performing at least a part of a certain operation, before performing the certain operation. In another example, the preloading can represent an operation of previously performing at least a part of a certain operation automatically without a user input, before performing the certain operation.

In step 601, the processor 120 can receive at least one piece of tag information from at least one tag. For example, the processor 120 can receive at least one piece of tag information from at least one tag, using the RFID antenna 225-1 and the RFID module 225 (or RFID IC). For example, the RFID module 225 can perform a scan operation for searching at least one tag. If receiving at least one piece of tag information from the at least one tag through the RFID antenna 225-1, the RFID module 225 can forward the received at least one piece of tag information to the processor 120.

Tag information received from a tag can include a unique ID of a card (or tag). The tag information can include information about a service (or item) provided through the tag, the type of the service, a manufacturing company of the service, etc., beside the unique identification of the card. The tag information can include information about the term of validity of data, a name of the data, a description of the data, a price of the data, a URL of the data, and a URN of the data.

A tag can be included in a card that is implemented in a form of being installed in the electronic device 101. A 'tag' and a 'card' including the tag are used and described interchangeably. However, various embodiments of the present disclosure are, through illustrating the card, identically or similarly applicable even to instruments such as a pen, a micro SD card, a USB jack, etc., which can also be installed, inserted or connected to the electronic device 101, as well as the card.

The processor 120 can receive at least one piece of tag information from at least one tag, using the NFC module 227 and the NFC antenna 227-1, in addition to the RFID module 225 and the RFID antenna 225-1. For example, in case where a tag is located at a relatively close distance (e.g., 10 cm or less), the processor 120 can receive tag information from the tag, using the NFC module 227 and the NFC antenna 227-1.

A tag can be implemented in a form of a dual tag that consists of two tags including each of the RFID antenna pattern 225-1 and the NFC antenna pattern 227-1. In a case where a tag includes an antenna (or antenna pattern) of a frequency band of 13.56 MHz supporting all of RFID communication and NFC communication, the tag can be implemented as one tag, not the dual tag.

In step 603, the processor 120 can determine a priority order between the tag information (or tag or card) received from the tag (or card).

The processor 120 can determine a priority order between at least one card, based the at least on at least one piece of tag information received from the at least one card.

The electronic device 120 can determine a priority order between at least one card, based at least on an intensity of a signal received from an RFID tag included in each of the at least one card. For example, an intensity of a signal (or response signal) reflected from a tag in response to a scan signal of the electronic device 101 can be inversely proportion relationship with a distance between the electronic device 101 and the tag. For example, the intensity of the signal reflected from the tag can be stronger as the distance between the electronic device 101 and the tag is closer. The processor 120 can determine (or grant) high priority order for a tag in which the intensity of the signal reflected from the tag is large.

In a case where at least one card including a tag is installed in the electronic device 101, the electronic device 101 can determine a priority order between the at least one card in accordance with a degree of association with the at least one card installed in the electronic device 101. For example, the processor 120 can determine high priority order for a tag whose content title, name, theme, etc. are the same as those of content (or service) provided through a card installed in the electronic device 101. The processor 120 can determine high priority order for a tag whose content type is the same as that of content (or service) provided through a card installed in the electronic device 101. The processor 120 can determine high priority order for a tag whose manufacturing company is the same as that of a card installed in the electronic device 101 or whose content provider is the same as a provider of content provided through the card.

When a card is uninstalled from the electronic device 101, the electronic device 101 can determine a priority order between the at least one card in accordance with a degree of association with the uninstalled at least one device, as will be described below with reference to FIG. 8.

The electronic device 101 can determine a priority order between the at least one card in accordance with situation information of the electronic device 101. The situation information can include information about the electronic device 101, information about a tag, information about a peripheral environment of the electronic device 101, etc.

For example, the information about the electronic device 101 can include information related with an application (or content) that is being executed in the electronic device 101. For example, the electronic device 101 can determine a high priority order for a tag related with an application (or content) that is being executed in the electronic device 101. In another example, the electronic device 101 can determine a higher priority order for a tag related with an application that is being executed in a foreground of the electronic device 101, than a tag related with an application that is being executed in a background of the electronic device 101.

In another example, the information about the electronic device 101 can include history information. The electronic device 101 can determine a high priority order for a tag related with content of which the number of execution is great. The electronic device 101 can determine a high priority order for a tag related with content executed at an execution time, for example, the latest time point.

The information about the electronic device 101 can include information about the type of the electronic device 101, etc. For example, in case where the electronic device 101 is an MP3 player supporting only music (or sound), the electronic device 101 can determine high priority order for a tag related with music, for example, a tag related with a music file.

Situation information of the tag can include information about a capacity of content available through the tag. For example, when the tag information received from the tag includes capacity information of content that will be downloaded from an external device (e.g., server), the processor 120 can determine a priority order for the tag in accordance with a capacity of the content that will be downloaded. For example, the processor 120 can determine higher priority order for the tag as the capacity of the content that will be downloaded from the external device is smaller.

Situation information of a peripheral environment of the electronic device 101 can include information about a position, etc. of the electronic device 101. The processor 120 can measure a position of the electronic device 101, using information received through a GPS, NFC, Wi-Fi, BT, a beacon, an ultrasonic input device, etc. and/or internet protocol (IP) information allocated to a communication unit. For example, the processor 120 can measure a position of the electronic device 101, using received BT low energy (BLE) beacon information. In another example, the processor 120 can receive position information of the electronic device 101 from a satellite, using a GPS signal. In a further example, the processor 120 can measure a position of the electronic device 101 from a Wi-Fi service set identifier (SSID) received through a wireless LAN. The processor 120 can measure a position of the electronic device 101 from a cell-ID received from a base station. The electronic device 101 can determine high priority order for a tag related with a current position of the electronic device 101. For example, if the electronic device 101 is located in an art museum, the electronic device 101 can determine high priority order for a tag related with a painting within the art museum.

When the priority order of a tag (hereinafter, 'second tag') that is searched through a scan operation while the processor 120 downloads content related with tag information of a tag (hereinafter, 'first tag') from an external device (e.g., server) is higher than the priority order of the first tag, the processor 120 can allocate more resources to an operation of downloading content related with tag information of the second tag. For example, the processor 120 can overlap in time and execute (or in parallel) at least a part of a thread downloading content related with the tag information of the first tag and at least a part of a thread for a scan operation. If the second tag having higher priority order than the first tag is searched through the scan operation, the processor 120 can allocate more resources to the thread downloading the content related with the tag information of the second tag, than the thread downloading the content related with the tag information of the first tag.

The processor 120 can disregard content related with tag information of a tag of which a priority order is less than a designated criterion. For example, the processor 120 may not download the content related with the tag information of the tag whose priority order is less than the designated criterion, from an external device (e.g., server). In another example, the processor 120 can delete the tag information of the tag whose priority order is less than the designated criterion.

In step 605, the processor 120 can download content related with at least one piece of tag information from the external device, based at least on the determined priority order between the at least one tag.

The processor 120 can send a request for content related with tag information for a tag of which the determined priority order is higher than another tag, to the external device (e.g., server).

The processor 120 can allocate more resources to a thread processing an operation related with a tag whose priority order is higher. For example, the processor 120 can control the number of clocks of a CPU and/or a throughput downloading content, in accordance with priority order.

Though not illustrated in FIG. 6, the processor 120 can also check if content related with at least one piece of tag information is received from at least one tag that has been stored in the memory 130. For example, the processor 120 can check at least one piece of tag information received from at least one card and, if content related with the checked at least one piece of tag information has not been stored in the memory 130, the processor 120 can determine the at least one card as an object to determine priority order. In another example, if the content related with the at least one piece of tag information has been stored in the memory 130, the processor 120 can exclude the at least one card from the object to determine the priority order, and may not send the request for the content related with the at least one piece of tag information to the external device (e.g., server).

Figure 7:
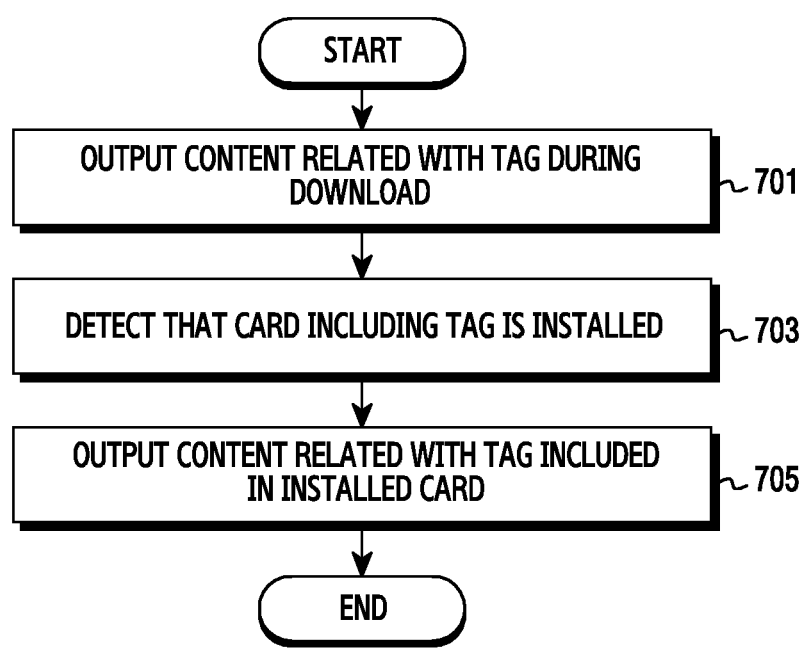
FIG. 7 is a flowchart of a method for preloading content, according to an embodiment of the present disclosure.

FIG. 7 is a flowchart of a method for preloading content, according to an embodiment of the present disclosure.

In step 701, while downloading content related with at least one piece of tag information of at least one tag, the processor 120 can output content related with the at least one tag. For example, while downloading content related with at least one piece of tag information of at least one card from an external device, the processor 120 can output content related with the at least one card. For example, while downloading content related with at least one piece of tag information, the processor 120 can output a representative image or animation related with at least one card. The electronic device 101 can also output a vibration using the motor 298 or output light using the optical interface 276.

While downloading content related with at least one piece of tag information, the processor 120 can output a part of content such as an image, an animation, etc. downloaded. For example, the processor 120 can output content which corresponds to the first image (e.g., I-frame) downloaded from the external device or the first frame of an animation downloaded from the external device. In a case where the processor 120 is outputting content, for example, content according to the execution of an application stored in the electronic device 101, the processor 120 can output downloaded content to a partial region of the display 160. While downloading content related with at least one piece of tag information, the processor 120 can output an image or animation previously stored in the electronic device 101.

In a case where the processor 120 downloads content of an application that is being executed in a foreground, the processor 120 can output at least a part of the content whose downloading is ongoing, to a partial region of the display 160. In a case where the processor 120 downloads content of an application that is being executed in a background, the processor 120 can output a notification of notifying that the content whose downloading is ongoing is being downloaded.

While downloading content related with at least one piece of tag information from an external device, the processor 120 can output a notification of notifying that the downloading the content related with the at least one piece of tag information is ongoing. For example, while downloading content related with at least one piece of tag information from the external device, the processor 120 can output a text, an image, etc. notifying that the downloading of the content is ongoing.

In step 703, the processor 120 can detect that at least one card including a tag is installed in the electronic device 101.

The processor 120 can detect at least one card that is installed in the electronic device 101, by recognizing that the at least one card is located within a designated distance through the NFC module 227. A recognizable distance of the NFC module 227 can be implemented differently in accordance with a form (e.g., a length and a shape), etc. of the NFC antenna 227-1 (or NFC antenna pattern). For example, in a case where the recognizable distance of the NFC module 227 is implemented equal to or less than 1 cm, the processor 120 can detect that at least one card is installed in the electronic device 101, by detecting that the at least one card is located within a range of 1 cm.

The processor 120 can detect at least one card that is installed in the electronic device 101, by detecting that the at least one card gets in contact with the electronic device 101. For example, the electronic device 101 can detect at least one card that is installed in the electronic device 101, by detecting a contact between a tag pattern (or a tag antenna pattern) included in the at least one card and a metallic contact terminal (e.g., a contact C-clip) included in the electronic device 101.

In operation 705, the processor 120 can output content related with a tag included in at least one card installed.

For example, the processor 120 can change a displayed UI or UX, using content related with a card, for example, content preloaded from the external device (e.g., server). For example, the processor 120 can change a theme, an icon, etc. of a screen that is being displayed, using the content (or downloaded content) related with the card. In another example, the processor 120 can execute a game, etc., using content downloaded from the external device. The processor 120 can also execute various contents preloaded from the external device.

Figure 8:
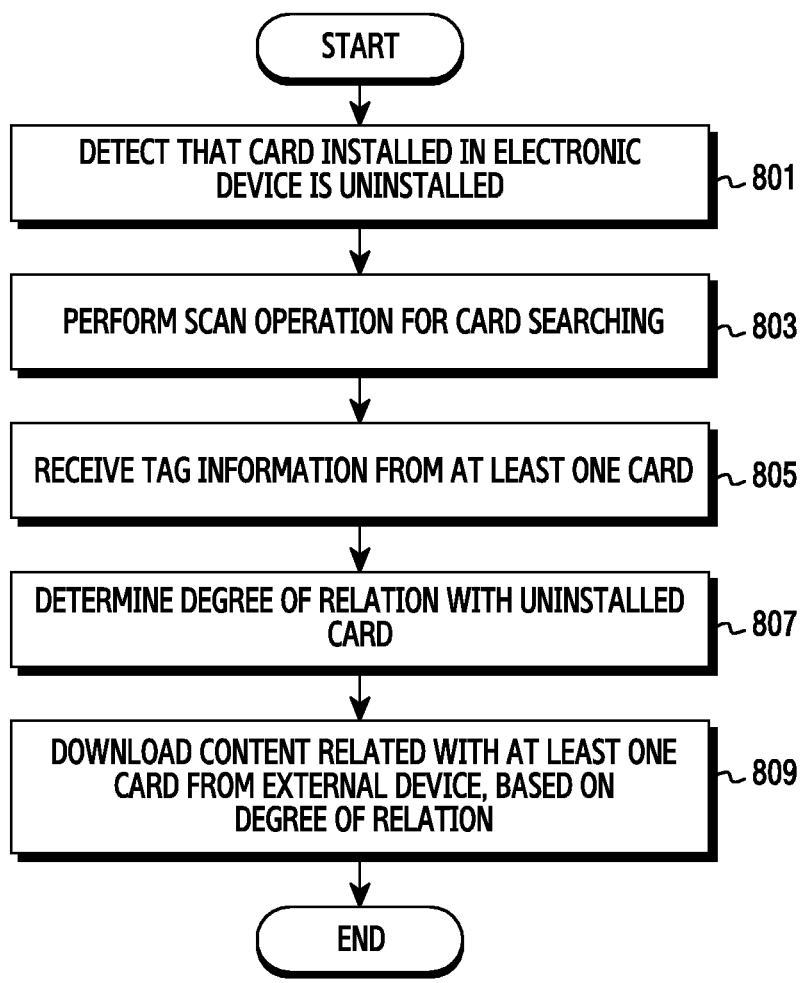
FIG. 8 is a flowchart of a method for preloading content, according to an embodiment of the present disclosure.

FIG. 8 is a flowchart of a method for preloading content according to an embodiment of the present disclosure.

In step 801, the processor 120 can detect if at least one card is uninstalled from the electronic device 101.

The processor 120 can detect if at least one card is uninstalled from the electronic device 101, by recognizing that the at least one card installed in the electronic device 101 is spaced apart equal to or greater than a designated distance from the electronic device 101 through the NFC module 227. For example, in a case where an intensity of a signal received from the at least one card installed in the electronic device 101 is equal to or is less than a designated intensity, the processor 120 can determine that the at least one card is uninstalled from the electronic device 101.

The processor 120 can detect if at least one card is uninstalled from the electronic device 101, by detecting that the at least one card is released from contact. For example, the processor 120 can detect if the at least one card is uninstalled from the electronic device 101, by detecting a release of a contact between a tag pattern (or a tag antenna pattern) included in the at least one card and a metallic contact terminal (e.g., a contact C-clip) included in the electronic device 101.

In step 803, the processor 120 can perform a scan operation for searching at least one card located around the electronic device 101. For example, the processor 120 can control the RFID module 225 to perform the scan operation during a designated time (or time slice). The time for performing the scan operation can be designated by a user.

The processor 120 can perform the scan operation for searching at least one card, using the NFC module 227 as well.

In step 805, the processor 120 can receive tag information from at least one card. For example, the processor 120 can receive tag information from at least one tag included in the at least one card.

The tag information can include a unique ID of a card (or tag). The tag information can include at least one among information about a service (or item) provided through the tag, the type of the service, a manufacturing company of the service, etc., beside the unique identification of the card. The tag information can include at least one among information about the term of validity of data, a name of the data, a description of the data, a price of the data, a URL of the data, and a URN of the data.

In step 807, the processor 120 can determine a degree (or priority order) of relation (or association) between the at least one card located around the electronic device 101 and the uninstalled at least one card, based at least on the received at least one piece of tag information.

The processor 120 can determine that a degree of relation with the uninstalled card is high for a card providing content whose title, name, theme, etc. are the same as those of content provided (or having been provided) through the uninstalled at least one card.

The processor 120 can determine that a degree of relation with the uninstalled card is high for a card providing content whose type (or category) is the same as that of content provided (or having been provided) through the uninstalled at least one card.

The processor 120 can determine that a degree of relation with the uninstalled card is high for a card of which a manufacturing company or a provider of content provided through the card is the same as a manufacturing company of the uninstalled at least one card or a provider of content provided through the uninstalled at least one card.

If it is determined that a degree of relation between at least one card located around the electronic device 101 and an uninstalled card is equal to or is less than a designated criterion, the processor 120 can determine that content related with the at least one card determined equal to or less than the criterion is not downloaded from an external device. For example, if it is determined that the type of content provided by the uninstalled card and the type of content provided by the card searched through the scan operation are different from each other, the processor 120 can determine that the content related with the searched card is not downloaded from the external device.

In step 809, the processor 120 can download the content related with the at least one card from the external device, based at least on the degree of relation with the uninstalled card. For example, the processor 120 can download content related with a card of which a degree of relation with the uninstalled card is high, from the external device. The processor 120 can allocate more resources to a thread downloading content related with a card of which a degree of relation with the uninstalled card is high. For example, the processor 120 can control the number of clocks of a CPU, and/or a throughput downloading content, in accordance with the degree of relation with the uninstalled card.

Figure 9:
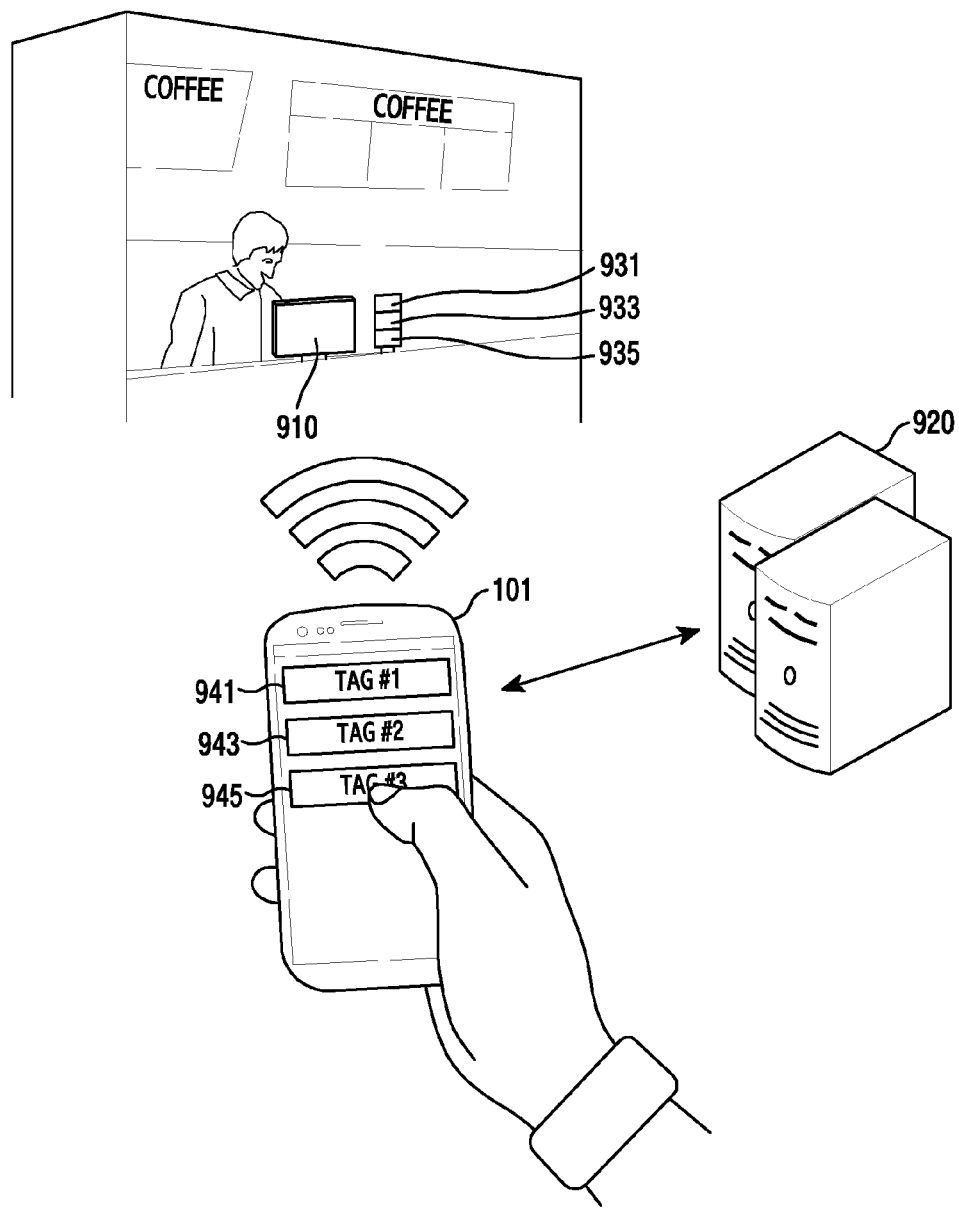
FIG. 9 is a diagram of a method for preloading content, according to an embodiment of the present disclosure.

FIG. 9 is a diagram for describing a method for preloading content, according to an embodiment of the present disclosure.

FIG. 9 illustrates a scenario in which a content preloading method of the electronic device 101 is, for example, utilized for payment, etc. in a coffee shop, etc.

At least one of tags 931, 933 and 935 (or a device including a tag) can be arranged in a coffee shop. For example, the tag 931, 933 or 935 can be arranged at a desk making payment for goods. The tag 931, 933 or 935 can include information about goods sold in the coffee shop, for example, discount information, etc. of the goods.

The electronic device 101 can perform a scan operation for searching the tag 931, 933 or 935. When the tag 931, 933 or 935 is located within a designated distance from the electronic device 101, the electronic device 101 can detect the tag 931, 933 or 935, using the RFID module 225, and receive at least one piece of tag information from the tag 931, 933 or 935. For example, in case where users of the electronic device 101 are standing in a long queue for the purpose of goods payment, the electronic device 101 can receive at least one piece of tag information from the tag 931, 933 or 935 arranged at the desk.

The electronic device 101 can perform a preloading operation for the received at least one piece of tag information. For example, the content related with the at least one piece of tag information can be previously downloaded by the electronic device 101 from an external device (e.g., server) 920.

The electronic device 101 can output the at least one piece of tag information received from the tag 931, 933 or 935, through the display 160. While downloading the content related with the at least one piece of tag information from the external device, the electronic device 101 can output a part of the downloaded content. For example, as illustrated in FIG. 9, the electronic device 101 can output content 941 related with the tag 931, content 943 related with the tag 933, and content 945 related with the tag 935.

The electronic device 101 can recommend a payment means of the highest priority order to a user, based at least on at least one piece of tag information. For example, the electronic device 101 can check a discount rate, the term of validity, etc. of goods included in the at least one piece of tag information, and recommend a payment means (e.g., a credit card) in which a discount rate for goods is highest and the term of validity does not expire. The electronic device 101 can transmit the at least one piece of tag information to the external device 920, and receive information about a payment means of the highest priority order from the external device 920.

Though not illustrated in FIG. 9, a device 910 of the desk can receive at least one piece of tag information from at least one tag included in the electronic device 101, and recommend a payment means of the highest priority order to a user of the electronic device 101, based at least on the received at least one piece of tag information.

For example, the device 910 of the desk can detect at least one tag included in the electronic device 101, using the RFID module 225. The at least one tag included in the electronic device 101 can receive tag information, for example, information about at least one card that a user of the electronic device 101 possesses (e.g., a manufacturing company of the card, goods discounted at purchasing goods using the card, a discount rate at purchasing goods using the card, etc.). The information about the at least one card that the user of the electronic device 101 possesses can be stored within the at least one tag included in the electronic device 101. Each of the information about the at least one card that the user possesses can be stored within each of the at least one tag included in the electronic device 101.

The device 910 of the desk can recommend, for example, a payment means of the highest discount rate among at least one payment means that the user of the electronic device 101 possesses, based at least on at least one piece of tag information received from the electronic device 101. The device 910 of the desk can transmit the at least one piece of tag information to the external device, and recommend, for example, a payment means of the highest discount rate to the user of the electronic device 101 from the external device.

Figure 10:
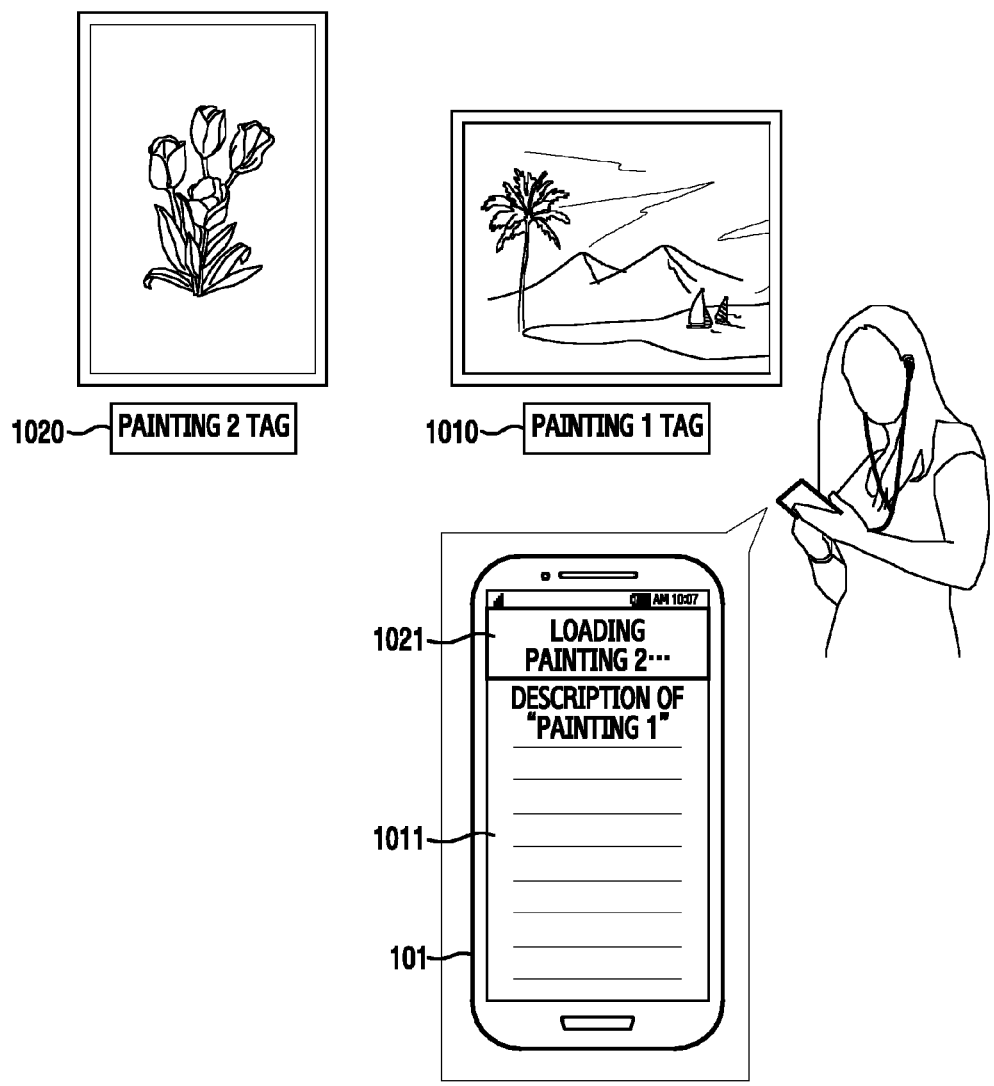
FIG. 10 is a diagram of a method for preloading content, according to an embodiment of the present disclosure.

FIG. 10 is a diagram for describing a method for preloading content, according to an embodiment of the present disclosure.

FIG. 10 illustrates a scenario in which a content preloading method of the electronic device 101 is, for example, utilized for viewing, etc. of art works in an art museum, etc.

The electronic device 101 is outputs tag information received from a tag 1010 through the RFID module 225, or tag information related information (or content) 1011 downloaded from an external device. If the electronic device 101 is located within a designated distance from a tag 1020 by accessing the tag 1020, the electronic device 101 can receive tag information from the tag 1020. If receiving the tag information from the tag 1020, the electronic device 101 can preload information (or content) related with the tag information from the external device. For example, if receiving the tag information from the tag 1020, the electronic device 101 can download information (or content) related with the tag information from the external device, and output a notification 1021 for notifying that the downloading is ongoing. If receiving the tag information from the tag 1020, the electronic device 101 can download information (or content) related with the tag information from the external device, and output a part of the information whose downloading is ongoing.

In a case where the electronic device 101 is located within a designated distance (e.g., 1 cm) from the tag 1020, the electronic device 101 can output information related with the tag 1020 in place of the information (or content) related with the tag 1010, to the majority of a region of the display 160. For example, in case where the electronic device 101 detects that it is located within a designated distance from the tag 1020 through the NFC module 227, the electronic device 101 can output the preloaded tag 1020 related information. The electronic device 101 can output the preloaded tag 1020 related information, based at least on a user input choosing the tag 1020.

Figure 11:
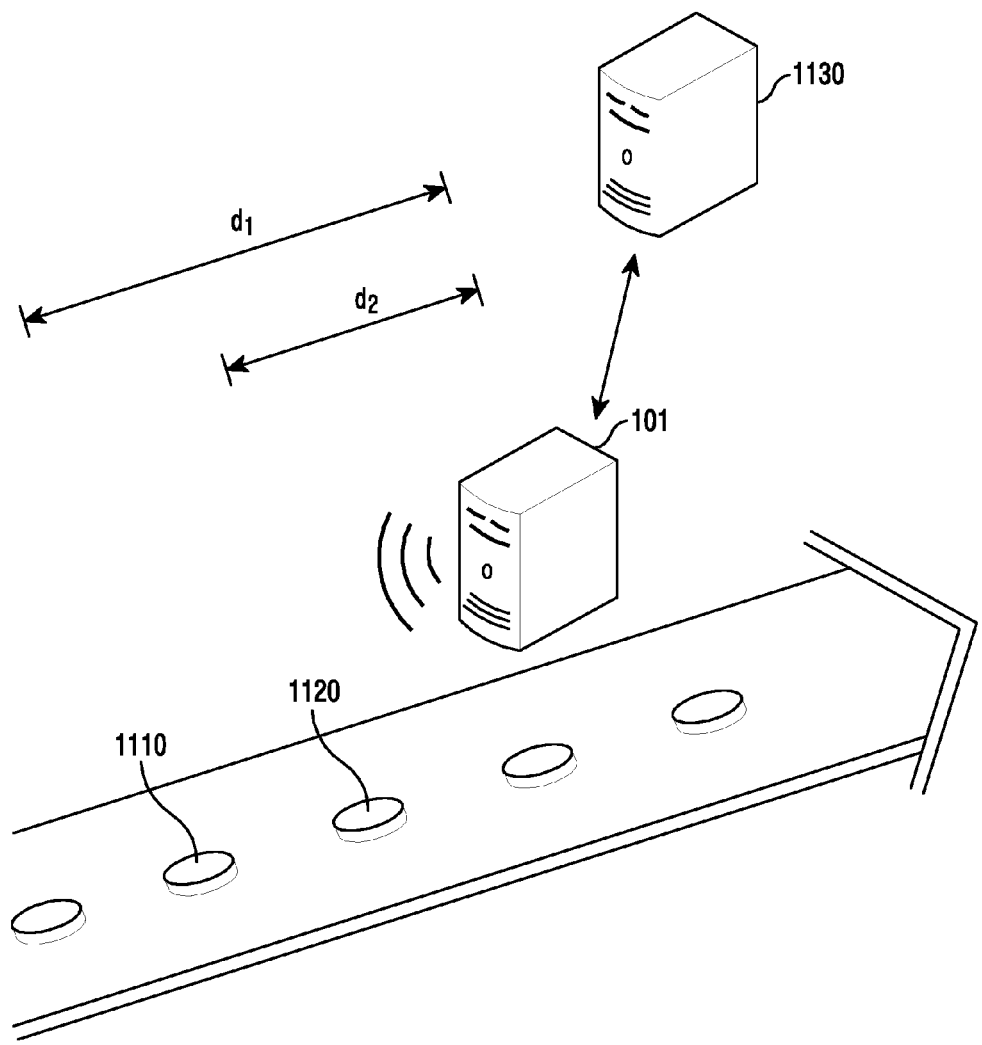
FIG. 11 is a diagram of a method for preloading content, according to an embodiment of the present disclosure.

FIG. 11 is a diagram for describing a method for preloading content, according to an embodiment of the present disclosure.

FIG. 11 illustrates a scenario in which a content preloading method of the electronic device 101 is, for example, utilized for products inspection using a belt (e.g., a conveyor belt).

The electronic device 101 can perform a first check when a tag is located at a designated distance (d1) from the electronic device 101, using the RFID module 225, and perform a second check when the tag is located at a designated distance (d2) from the electronic device 101. For example, if a tag 1110 is located at the designated distance (d1) from the electronic device 101, the electronic device 101 can receive tag information from the tag 1110, and transmit the tag information received from the tag 1110 and information of notifying that the tag 1110 is located at the 1st distance (d1), to an external device 1130. The electronic device 101 can receive the first check result of performing the 1st check for the tag from the external device 1130. In another example, in a case where the tag 1120 is located at the designated distance (d2) from the electronic device 101, the electronic device 101 can receive tag information from the tag 1120, and transmit the tag information received from the tag 1120 and information of notifying that the tag 1120 is located at the 2nd distance (d2), to the external device 1130. The electronic device 101 can receive the second check result of performing the second check for the tag from the external device 1130.

For example, the external device 1130 (e.g., server) can include a plurality of servers performing a check corresponding to a designated distance. For example, in a case where a tag is located at the designated distance (d1), a first server among the plurality of servers can receive tag information of the tag from the electronic device 101, and perform a first check. In a case where the tag is located at the designated distance (d2), a second server among the plurality of servers can receive tag information of the tag from the electronic device 101, and perform only a second check as well.

Figure 12:
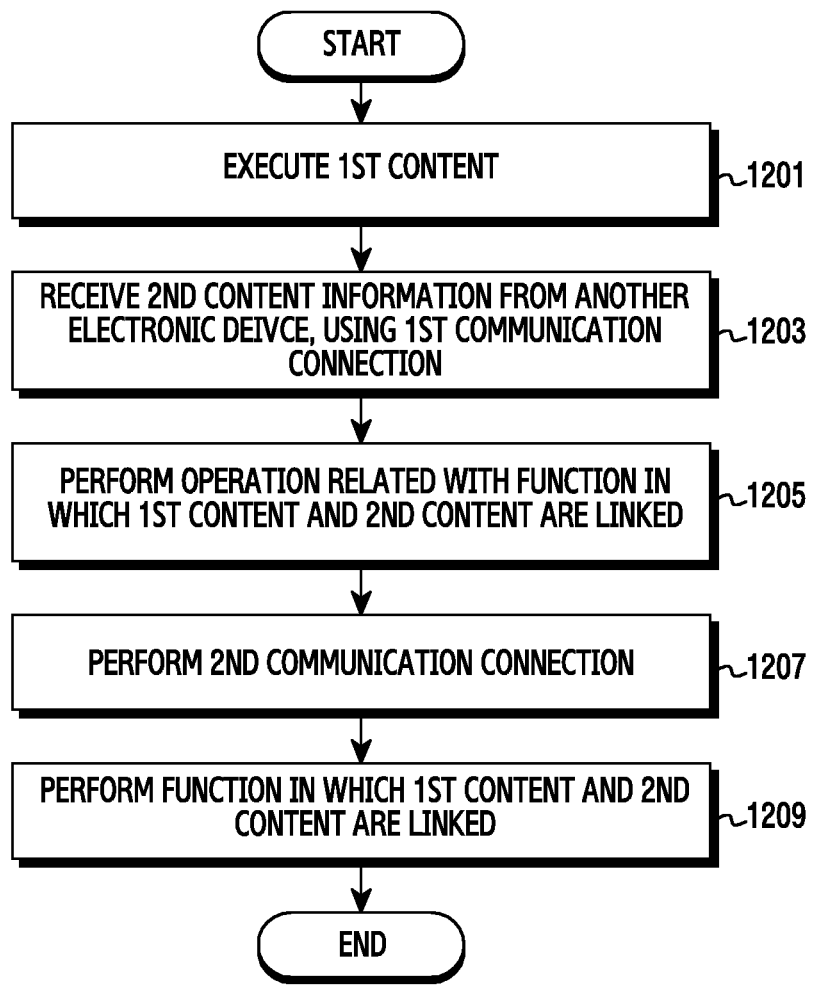
FIG. 12 is a flowchart of a method for preloading content, according to an embodiment of the present disclosure.

FIG. 12 is a flowchart for describing a method for preloading content, according to an embodiment of the present disclosure. For example, FIG. 12 is a diagram for describing a method in which the electronic device 101, which is installing a card, is linked to at least one other electronic device, which is also installing a card.

In step 1201, the electronic device 101 can execute content (hereinafter, referred to as 'first content') related with a card installed in the electronic device 101. The electronic device 101 can output the first content of a character related with the card installed in the electronic device 101. For example, the electronic device 101 can output a still image, a video (e.g., an animation, etc.), etc. of the character related with the card. The electronic device 101 can output a background screen (e.g., a character theme screen) related with the character related with the card, a home screen related with the character related with the card, etc. as well as the image of the character related with the card.

The electronic device 101 can download data about the first content from a server, etc. (e.g., a content provision server, a content service provider server, etc.), and execute the downloaded data about the first content. The electronic device 101 can execute the first content in real-time (e.g., streaming scheme), using the server.

In step 1203, the electronic device 101 can receive information about content (hereinafter, referred to as 'second content') related with a card installed in the other electronic device, using a first communication connection.

The electronic device 101 can detect the other electronic device that is within a designated distance from the electronic device 101, using the first communication connection, and perform communication connection with the other electronic device. For example, the electronic device 101 can detect the other electronic device that accesses a range of a designated distances (e.g., 100 m) from the electronic device 101, using a first communication module, for example, the RFID module 225. The electronic device 101 can perform RFID communication connection with the detected other electronic device. However, the first communication module can include at least one of the NFC module 227, the BT module 223, the Wi-Fi direct module, etc. as well as the RFID module 225.

If the electronic device 101 is connected with the first communication to the other electronic device, the electronic device 101 can receive the information about the second content related with the card installed in the other electronic device from the other electronic device.

The information about the second content can include information about the second content itself. For example, if the second content is content on a specific character, the information about the second content can include information about a character title (or name), a character ID, a character image, etc.

In a case where the second content is executed in the first communication connected other electronic device, the information about the second content can include execution information of the second content. For example, in a case where the second content is content related with a game, and is executed in the first communication connected other electronic device, the information about the second content can include information about a possessed online game item, level (or step), etc.

The information about the second content can include use relation information, etc. of the second content (e.g., copyright related use validity term information of the second content, and billing information).

The electronic device 101 can further include unique device information (e.g., a device ID, etc.), etc. of the first communication, besides the information about the second content.

In step 1205, the electronic device 101 can perform an operation related with a linkage (or combination) function of the first content and the second content. For example, the electronic device 101 can previously perform at least a part of an operation of the linkage function.

The electronic device 101 can determine if the second content is content possible to perform the linkage function with the first content, based at least on the information about the second content received from the first communication connected other electronic device 101. For example, in a case where content is content on a character, the electronic device 101 can determine if a character of the first content and a character of the second content are possible to be combined and generated as one character, if it is possible to generate new content such as a video by using the character of the first content and the character of the second content, etc. The electronic device 101 can determine if the first content and the second content are concurrently adjustable (or controllable), etc.

To determine if the second content is the content possible to perform the linkage function with the first content, the electronic device 101 can use relation information of the first content or the second content (e.g. copyright related use validity term information of the content and billing information). For example, if it is determined that the term of validity of the second content expires, the electronic device 101 can determine the second content as not being able to perform the linkage function with the first content.

If it is determined the second content as the content possible to perform the linkage function with the first content, the electronic device 101 can search if there is data for performing at least a part of the linkage function within the electronic device 101, in order to perform the at least part of the linkage function. If it is checked as the search result that there is no data for performing the at least part of the linkage function, the electronic device 101 can send a request for the data for performing the at least part of the linkage function to the server or the at least another electronic device having transmitted the information about the second content.

In step 1207, the electronic device 101 can perform the second communication connection with the other electronic device. For example, the electronic device 101 can perform the second communication connection with the other electronic device that is performing the first communication connection or has performed the first communication connection.

The electronic device 101 can perform the second communication connection with the other electronic device, using the NFC module 227. For example, when the other electronic device is located within a designated distance (e.g., 10 cm) from the electronic device 101, the electronic device 101 can perform the second communication connection with the other electronic device, using the NFC module 227. The electronic device 101 can perform the second communication connection with the at least other electronic device, using at least one of the RFID module 227, the BT module 223, the Wi-Fi direct module, etc.

In step 1209, the electronic device 101 can perform the function in which the first content and the second content are linked (or combined) with each other, at the time of the second communication connection with the other electronic device.

The electronic device 101 can perform the linkage function of the first content and the second content, based at least on the operation related with the linkage (or combination) function of the first content and the second content of step 1205. For example, the electronic device 101 can perform the linkage function of the first content and the second content, without needing to again determine if the second content is content possible to perform the linkage function with the first content. The electronic device 101 can perform the linkage function of the first content and the second content, without again determining if the character of the first content and the character of the second content are possible to be combined and generated as one character, if it is possible to generate new content such as a video, etc. by using the character of the first content and the character of the second content, etc. If the electronic device 101 is previously performing at least a part of the operation of the linkage function, the electronic device 101 can keep performing the remnant operation of the linkage function. For example, if the electronic device 101 is previously downloading a part of the data for performing the operation of the linkage function, the electronic device 101 can download the remnant data, thereby rapidly performing the linkage function.

The electronic device 101 can perform various functions in which the first content and the second content are linked to each other.

For example, when content is content on a character, the electronic device 101 can generate a character combining a character of the first content and a character of the second content. The electronic device 101 can output a video including the character of the first content, the character of the second content, etc. The electronic device 101 can transmit information about the first content (or the character of the first content) and the second content (or the character of the second content) to the server, and receive a video including the character of the first content, the character of the second content, etc. generated in the server. The electronic device 101 can output the received video including the character of the first content, the character of the second content, etc.

The following description is made with respect to the electronic device 101, which is installing a card, linked to another electronic device, which is also installing a card.

Figure 13B:
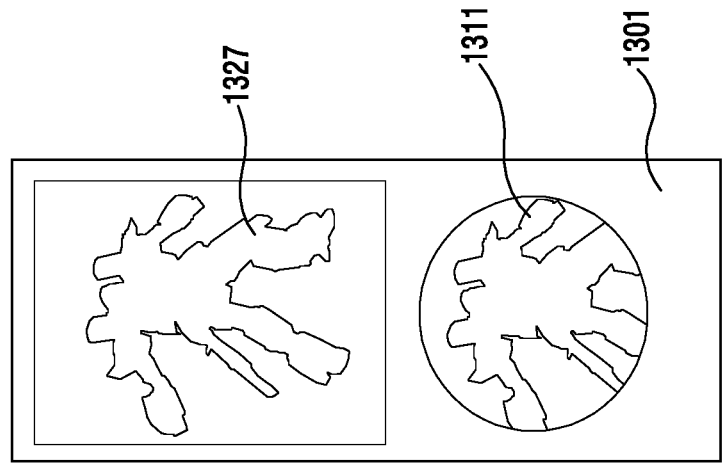
FIGS. 13A and 13B are diagrams of a method for preloading content, according to an embodiment of the present disclosure.
Figure 13A:
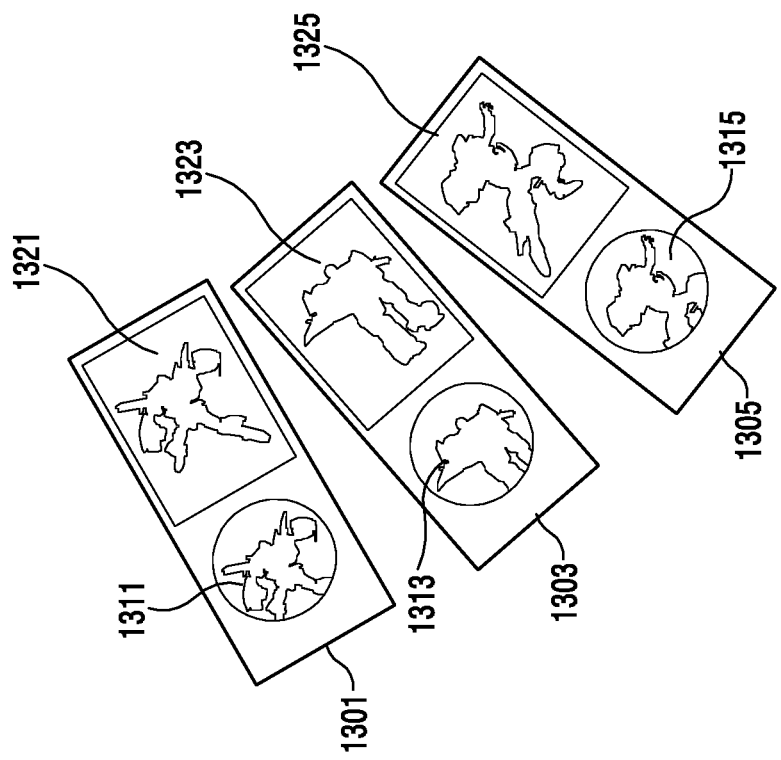

FIGS. 13A and 13B are diagrams for describing a method for preloading content, according to an embodiment of the present disclosure. For example, FIGS. 13A and 13B are diagrams illustrating an example of, in a case where content is a character, generating a new character when electronic devices are linked and installing cards.

Referring to FIG. 13A and FIG. 13B, electronic devices 1301 to 1305 can install (or insert or couple) cards 1311 to 1315, respectively. As illustrated in FIG. 13A, when the cards 1311 to 1315 are installed respectively in the electronic devices 1301 to 1305, the electronic devices 1301 to 1305 can output contents 1321 to 1325 related with the cards 1311 to 1315, for example, characters (e.g., robots, etc.) related with the cards 1311 to 1315, to a display, respectively. The content related with the card can include content according to game application execution.

The electronic devices 1301 to 1305 can be connected to each other. For example, when the electronic device 1301 is located within a designated distance (e.g., 100 m) from electronic devices 1303 or 1305, the electronic device 1301 can be connected with the electronic device 1303 or 1305, using the RFID module 225. However, the communication module can include at least one of the NFC module 227, the BT module 223, the Wi-Fi direct module, etc. as well as the RFID module 225.

If the electronic devices 1301 to 1305 are connected to each other, the electronic devices 1301 to 1305 can exchange information about the contents 1321 to 1325 related with the cards 1311 to 1315 installed respectively in the electronic devices 1301 to 1305. For example, the electronic device 1301 can exchange information about a character title (or name), a character ID, a character image, etc. with the electronic devices 1303 or 1305.

Each of the electronic devices 1301 to 1305 can perform at least a part of an operation of a linkage function, based at least on the exchanged information about the content. For example, the electronic device 1301 can determine if the electronic device 1301 can generate a combined character by combining a character 1321 related with the card 1311 of the electronic device 1301 and characters 1323 and 1325 related with the cards 1313 and 1315 of the electronic device 1301. If it is determined that the electronic device 1301 can generate the combined character, the electronic device 1301 can determine if information about the combined character has been stored in the electronic device 1301. If it is determined that the information about the combined character has not been stored in the electronic device 1301, the electronic device 1301 can send a request for the information about the combined character to a server. If the server transmits the information about the combined character to the electronic device 1301 in response to the request for the information about the combined character, the electronic device 1301 can receive the information about the combined character from the server. If it is determined that the information about the combined character has not been stored in the electronic device 1301, the electronic device 13101 can send the request for the information about the combined character to the electronic devices 1303 and 1305, using a communication module (e.g., the RFID module 225, the BT module 223, etc.). If it is determined that the electronic device 1301 can generate the combined character, the electronic device 1301 can send a request for information for concurrently controlling the combined character by the electronic devices 1301 to 1305, to the server.

In a case where the electronic devices 1301 to 1305 are located within a designated distance (e.g., 10 cm), the electronic devices 1301 to 1305 can each perform a linkage function. For example, in a case where the electronic device 1301 is located within a designated distance from the electronic devices 1303 and 1305, the electronic device 1301 can be NFC communication connected using the NFC module 227. The electronic device 1301 can output a character combining the character 1321 related with the card 1311 of the electronic device 1301 and the characters 1323 and 1325 related with the cards 1313 and 1315 of the electronic devices 1303 and 1305. For example, as illustrated in FIG. 13B, the electronic device 1301 can output a robot combining a robot related with the card 1311 of the electronic device 1301, a robot related with the card 1313 of the electronic device 1303, and a robot related with the card 1315 of the electronic device 1305. In another example, the electronic device 1301 can also provide a recommendation for a character possible to be generated by combining the character 1321 related with the card 1311 of the electronic device 1301 and the characters 1323 and 1325 related with the cards 1313 and 1315 of the electronic devices 1303 and 1305.

In a case where a combined character 1327 is outputted from each of the electronic devices 1301 to 1305 through a linkage function, each of the electronic devices 1301 to 1305 can control an operation of the combined character 1327. For example, the electronic device 1301 can control an operation of at least a part of the combined character 1327, for example, a combination robot.

The electronic devices 1301 to 1305 can concurrently control the combined character 1327. For example, when the same input is concurrently inputted to the electronic devices 1301 to 1305, the electronic devices 1301 to 1305 can each perform a new specific function related with the combined character 1327 outputted from each of the electronic devices 1301 to 1305. For example, in case where the same input is concurrently inputted to the electronic devices 1301 to 1305, the combination robot can launch a missile. The input concurrently inputted to the electronic devices 1301 to 1305 can include a touch input (e.g., up/down/left/right swiping, touching on a specific region of a display, etc.), a motion (e.g., a motion of a circle, triangle, square, star-shaped locus) of the electronic device, etc. The input concurrently inputted to each of electronic devices 1301 to 1305 can include a motion, etc. of the electronic device, calculated using the acceleration sensor 240E, the gyro sensor 240B, etc. The electronic devices 1301 to 1305 can exchange information about the calculated motion, etc. of the electronic device between the electronic devices 1301 to 1305, using a communication module (e.g., the RFID module 225, the NFC module 227, the BT module 223, etc.). The electronic devices 1301 to 1305 can perform the new specific function of the generated character, by transmitting the information about the calculated motion to the server and receiving information about the new specific function of the generated character from the server.

FIGS. 14A-15C are diagrams for describing a method for preloading content, according to an embodiment of the present disclosure. For example, FIG. 14A-FIG. 15C are diagrams illustrating an example of, when content is content related with a character, generating contents including characters 1421 and 1423 related with cards 1411 and 1413 installed in a plurality of electronic devices 1401 and 1403.

Figure 14A:
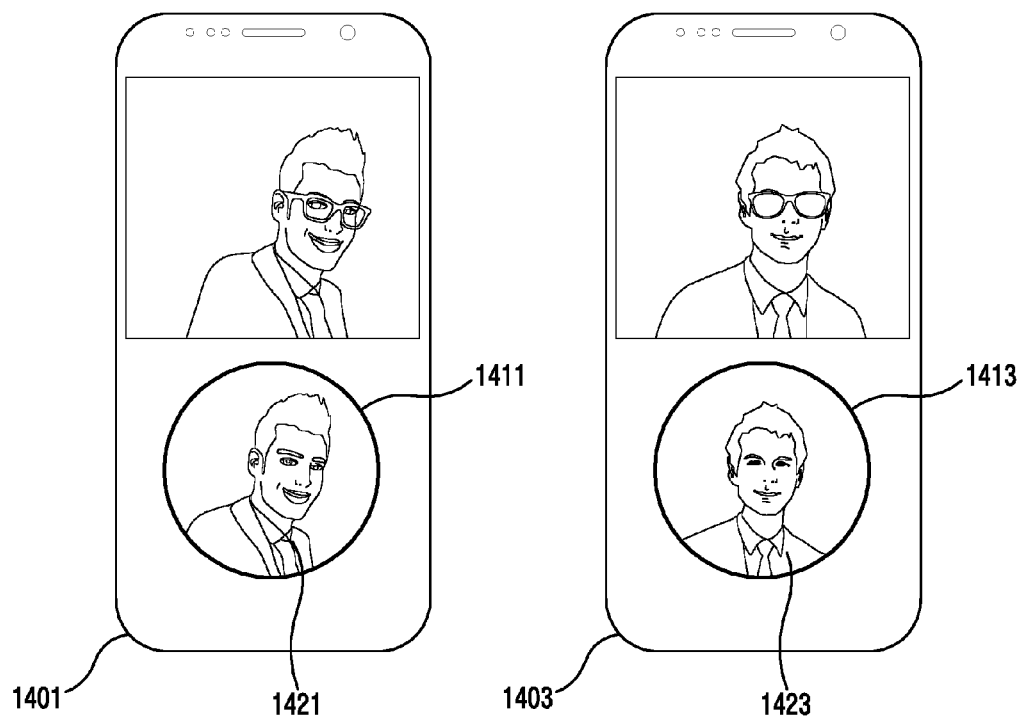
FIGS. 14A-14B and 15A-15C are diagrams of a method for preloading content, according to an embodiment of the present disclosure.
Figure 14B:
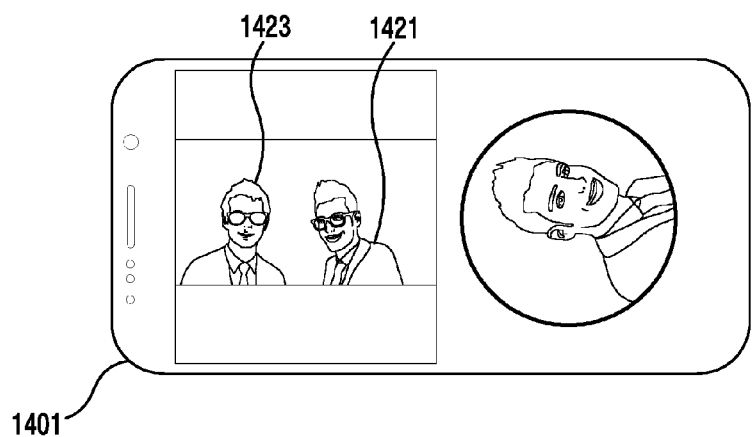

Referring to FIG. 14A and FIG. 14B, the electronic devices 1401 and 1403 can install (or insert or couple) cards 1411 and 1413, respectively. As illustrated in FIG. 14A, in a state in which the cards 1411 and 1413 are installed respectively in the electronic devices 1401 and 1403, the electronic devices 1401 and 1403 can output content related with the cards 1411 and 1413, for example, characters 1421 and 1423 related with the cards, to a display, respectively.

The electronic devices 1401 and 1403 can be connected to each other. For example, in a case where the electronic device 1401 is located within a designated distance (e.g., 100 m) from electronic device 1403, the electronic device 1401 can be connected with the electronic device 1403, using the RFID module 225. However, the communication module can include at least one of the NFC module 227, the BT module 223, the Wi-Fi direct module, etc. as well as the RFID module 225. However, it is not limited to this.

If the electronic devices 1401 and 1403 are be connected to each other, the electronic devices 1401 and 1403 can each exchange information about characters 1421 and 1423 related with cards 1411 to 1413 installed in the electronic devices 1401 and 1403. For example, the electronic device 1401 can exchange information about a character title (or name), a character ID, a character image, etc. with the electronic device 1403. However, the information mutually exchanged between the electronic devices 1401 and 1403 is not limited to this. For example, the electronic devices 1401 and 1403 can further exchange information including a unique device ID, etc. of each of the electronic devices 1401 and 1403.

Each of the electronic devices 1401 and 1403 can perform at least a part of an operation of a linkage function, based at least on the exchanged information about the content. For example, the electronic device 1401 can determine if the character 1423 is a character possible to combine with the character 1421 related with the card 1411 of the electronic device 1401 and output (or generate) content (e.g., animation, etc.) including the character 1421 and the character 1423. In another example, if it is determined that the character 1423 is the character possible to combine with the character 1421 and output the content including the character 1421 and the character 1423, the electronic device 1401 can determine if the information about the content to be outputted has been stored in the electronic device 1401. If it is determined that the information about the content to be outputted has not been stored in the electronic device 1401, the electronic device 1401 can send a request for the information about the content to be outputted, to a server. If the server transmits the information about the content to be outputted to the electronic device 1401 in response to the request for the information about the content to be outputted, the electronic device 1401 can receive the information about the content to be outputted from the server. The server can search the content including the character 1421 and the character 1423 from the electronic device 1401, and transmit the searched content to the electronic device 1401.

If it is determined that the information about the content to be outputted has not been stored in the electronic device 1401, the electronic device 1401 can also send the request for the information about the content to be outputted, to the electronic device 1403, using a communication module (e.g., the RFID module 225, the BT module 223, etc.).

In a case where the electronic devices 1401 and 1403 are mutually located within a designated distance (e.g., 10 cm), the electronic devices 1401 and 1403 can each perform a linkage function. For example, in case where the electronic device 1401 is located within a designated distance from the electronic device 1403, the electronic device 1401 can be NFC communication connected with the electronic device 1403, using the NFC module 227. The electronic device 1401 can output the content including the character 1421 and the character 1423. For example, the electronic device 1401 can, as illustrated in FIG. 14B, output the content including the character 1421 related with the card 1411 of the electronic device 1401, and the character 1423 related with the card 1413 of the electronic device 1403.

The content including the character 1421 related with the card 1411 of the electronic device 1401 and the character 1423 related with the card 1413 of the electronic device 1403 can include content on a location-based user experience. For example, the server can generate new content based on the location-based user experience of each of the electronic devices 1401 and 1403, and transmit the generated content to the electronic devices 1401 and 1403.

For example, the electronic device 1401 can record (or store) information about a place (or a history about the place) where the electronic device 1401 (or an electronic device user) has ever been located, in time order. In another example, the electronic device 1401 can record (or store) information about content related with a corresponding time and place (e.g., an image, etc., photographed at the corresponding time and place), together with the information on the place (or the history about the place) where the electronic device 1401 (or electronic device user) has ever been located, in time order.

The electronic device 1401 can transmit the information about the place where the electronic device has ever been located, and the information about the content related with the time and place, recorded in time order, to the server.

Based at least on time-dependent place information and content information received from the electronic devices 1401 and 1403, the server can generate new content related with the received time-dependent place and content, and transmit the generated new content to the electronic devices 1401 and 1403.

Figure 15A:
Figure 15B:
Figure 15C:

As illustrated in FIG. 15A-FIG. 15C, the electronic device 1401 can output new content received from the server. For example, the electronic device 1401 can output the way a character talks a designated theme 1431 through a speech balloon. The designated theme 1431 can include a behavior, etc. that a user has conducted at a designated time. For example, the electronic device 1401 can output content in which one of characters inquires of another character a behavior that a user has conducted during the weekend, like "What did you do during the weekend". As illustrated in FIG. 15B, the electronic device 1401 can output content in which a character of another electronic device 1403 is related with a corresponding time (e.g., weekend) and place of a user of the another electronic device 1403. For example, in a case where the user of the electronic device 1403 was located at sea during the weekend, the electronic device 1401 can output an image 1433 that the user of the electronic device 1403 photographed at sea during the weekend. As illustrated in FIG. 15C, the electronic device 1401 can output content in which the character 1421 of the electronic device 1401 is related with a corresponding time (e.g., weekend) and place of a user of the electronic device 1401. For example, when the user of the electronic device 1401 was located in an amusement park during the weekend, the electronic device 1401 can output an image 1435 in which the user of the electronic device 1401 photographed in the amusement park during the weekend. The diagrams of FIG. 15A-FIG. 15C can be a part of images outputted continuously. The diagrams of FIG. 15A-FIG. 15C can be generated in the server, based on the information (e.g., the information about the place, the content information related with the time and place, etc., recorded in time order) transmitted from the electronic devices 1401 and 1403.

Figure 16:
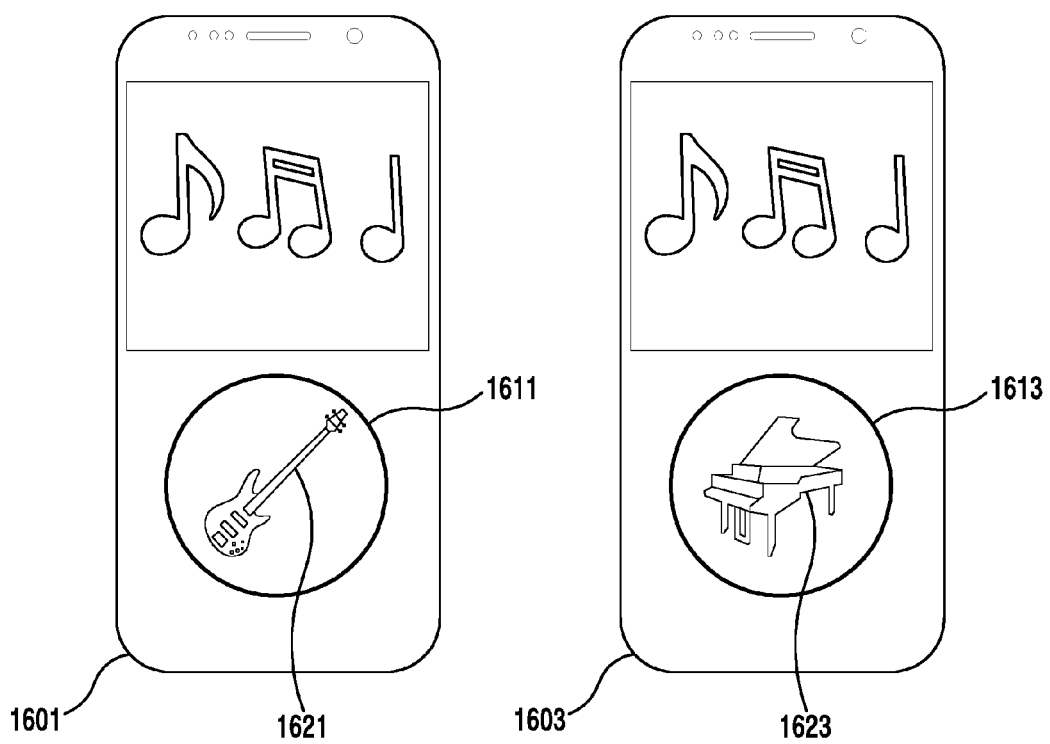
FIG. 16 and FIG. 17 are diagrams of a method for preloading content, according to an embodiment of the present disclosure.
Figure 17:
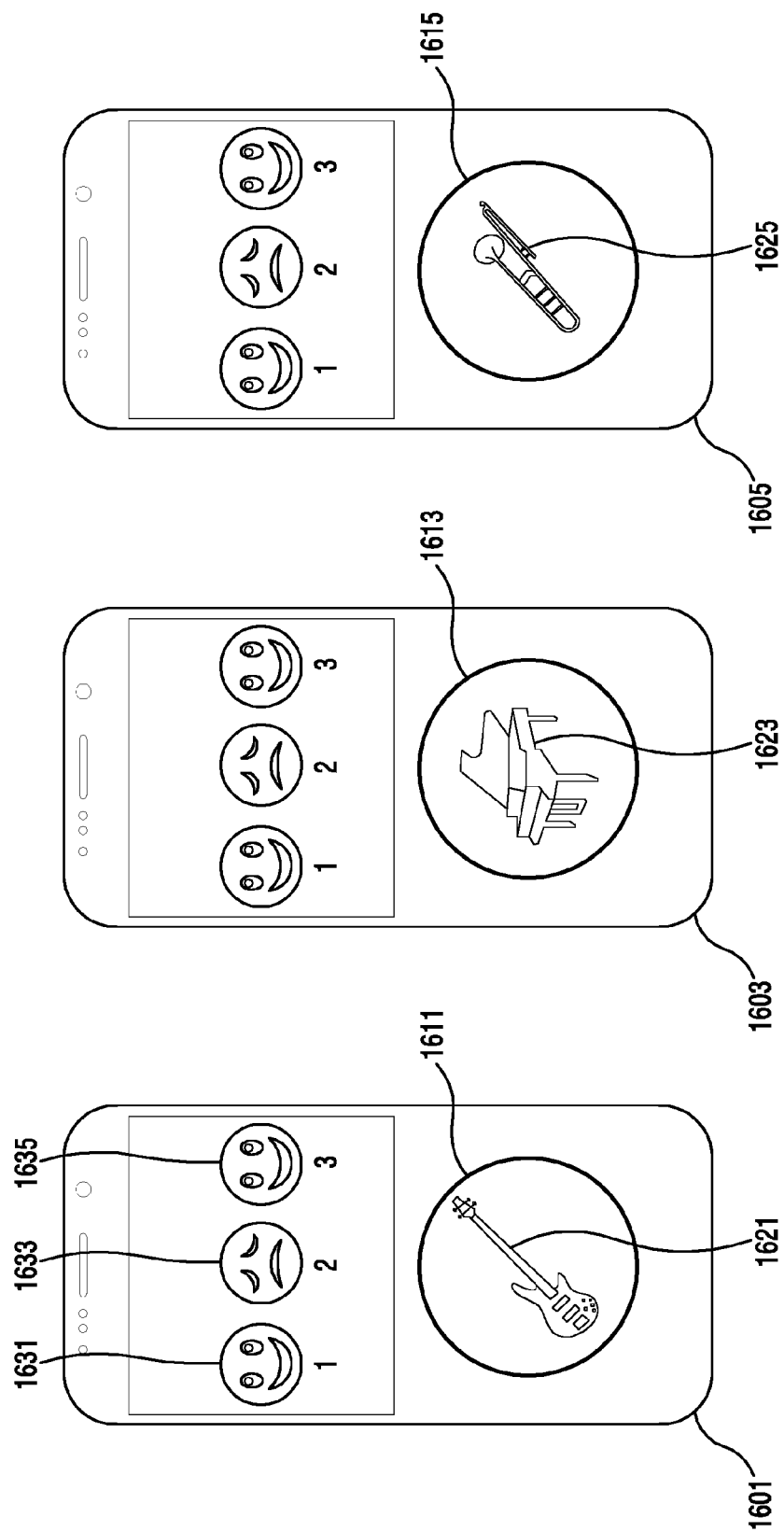

FIGS. 16 and 17 are example diagrams for describing a method for preloading content, according to an embodiment of the present disclosure. For example, FIGS. 16 and 17 illustrate examples in which, in a case where a card installed in an electronic device is for content related with a specific instrument, a plurality of electronic devices output combined music (e.g., ensemble) in link.

Referring to FIGS. 16 and 17, electronic devices 1601 and 1603 can install (or insert or couple) cards 1611 and 1613, respectively. As illustrated in FIG. 16, in a state in which the cards 1611 and 1613 are installed respectively in the electronic devices 1601 and 1603, the electronic devices 1601 and 1603 can output music by using contents related with the cards 1611 and 1613, for example, sound sources (or tone colors) corresponding to instruments related with the cards 1611 and 1613, respectively.

The electronic devices 1601 and 1603 can be connected to each other. For example, in a case where the electronic device 1601 is located within a designated distance (e.g., 100 m) from the electronic device 1603, the electronic device 1601 can be connected with the electronic device 1603, using the RFID module 225. However, the communication module can include at least one of the NFC module 227, the BT module 223, the Wi-Fi direct module, etc., as well as the RFID module 225.

If the electronic devices 1601 and 1603 are connected to each other, the electronic devices 1601 and 1603 each can exchange information about the contents related with the cards 1611 and 1613 each installed in the electronic devices 1601 and 1603. For example, the electronic device 1601 can exchange information about an instrument title (or name), an instrument ID, an instrument image, etc. with the electronic device 1603. The electronic devices 1601 and 1603 can further exchange information including a unique device ID, etc., of each of the electronic devices 1601 and 1603.

Each of the electronic devices 1601 and 1603 can perform at least a part of an operation of a linkage function, based at least on the exchanged information about the content. For example, the electronic device 1601 can determine if an instrument 1621 (e.g., guitar) related with the card 1611 is an instrument possible to combine with an instrument 1623 (e.g., piano) related with the card 1613 of the electronic device 1603 and generate ensemble music content. If it is determined that the instrument 1621 (e.g., guitar) is the instrument possible to combine with the instrument 1623 related with the card 1613 of the electronic device 1603 and generate the ensemble music content, the electronic device 1601 can determine if a sound source (or tone color) peculiar to the instrument 1621 has been stored in the electronic device 1601. If it is determined that the sound source peculiar to the instrument 1621 has not been stored in the electronic device 1601, the electronic device 1601 can send a request for the sound source peculiar to the instrument 1621, to a server. If the server transmits the sound source peculiar to the instrument 1621 to the electronic device 1601 in response to the request for the sound source peculiar to the instrument 1621, the electronic device 1601 can receive the sound source peculiar to the instrument 1621 from the server. The server can search the sound source peculiar to the instrument 1621 from the electronic device 1601, and transmit the searched sound source to the electronic device 1601.

If it is determined that information about content to be outputted has not been stored in the electronic device 1601, the electronic device 1601 can also send the request for the sound source peculiar to the instrument 1621 to the electronic device 1403, using a communication module (e.g., the RFID module 225, the BT module 223, etc.).

In a case where the electronic devices 1601 and 1603 are mutually located within a designated distance (e.g., 10 cm), the electronic devices 1601 and 1603 can each perform a linkage function. For example, when the electronic device 1601 is located within a designated distance from the electronic device 1603, the electronic device 1601 can be NFC communication connected with the electronic device

1603, using the NFC module 227. If the electronic devices 1601 and 1603 are NFC communication connected with each other, the electronic devices 1601 and 1603 can exchange information (e.g., played content) about music to be played in concert. The electronic devices 1601 and 1603 can output a sound source of an instrument and ensemble music that combines sound sources of instruments by using the sound source of the instrument, through a linkage function.

When outputting the ensemble music through the linkage function, the electronic devices 1601 and 1603 can each determine if the instruments are matched and played. When the electronic devices 1601 and 1603 each are not matched in play speed or play a different portion, the electronic devices 1601 and 1603 can each provide a guide for matching.

For example, as illustrated in FIG. 17, when a plurality of electronic devices 1601, 1603 and 1605 output ensemble music, the electronic devices 1601, 1603 and 1605 can each provide matching or non-matching, using emoticons. For example, the electronic device 1601 can output an emoticon 1631, 1633 or 1635 corresponding to a sound source of each of the electronic devices 1601, 1603 and 1605. The emoticon 1631 can correspond to the sound source of the electronic device 1601, and the emoticon 1633 can correspond to the sound source of the electronic device 1603, and the emoticon 1635 can correspond to the sound source of the electronic device 1605. When playing ensemble music, the electronic device 1601 can notify non-matching by differently outputting an emoticon look for the non-matched instrument (or the sound source of the instrument). For example, in FIG. 17, in a case where the sound source of the instrument 1623 related with the card 1613 of the electronic device 1603 is faster or slower in play speed than the sound source of the instrument 1621 or 1625 related with the card 1611 or 1615 of the another electronic device 1601 or 1605, the electronic device 1601 can output the emoticon 1633 of a crying look.

A method according to various exemplary embodiments of the present invention in an electronic device having a communication module having a Radio Frequency IDentification (RFID) module and a processor is provided. The method can include the operations of receiving at least one piece of tag information from at least one tag, using the RFID module, determining priority order between the at least one tag, based at least on the received at least one piece of tag information, and downloading content related with the at least one piece of tag information from an external device by using the communication module, based on the determined priority order.

The at least one tag can be each included in a card, and the card can include a card installable in the electronic device.

The operation of determining the priority order between the at least one tag can include the operation of determining the priority order in accordance with an intensity of a signal received from the at least one tag, or situation information of the electronic device.

When at least one card including the at least one tag is uninstalled from the electronic device in a state in which the at least one card is installed in the electronic device, the operation of determining the priority order between the at least one tag can include the operation of determining the priority order in accordance with a degree of association with the uninstalled at least one card.

The operation of downloading the content related with the at least one piece of tag information includes the operation of, while downloading the content related with the at least one piece of tag information, outputting content related with the at least one tag, or allocating a resource for performing the downloading operation in accordance with the determined priority order.

The method can further include the operation of performing, by the electronic device installing a 1st card, a linkage function with at least one another electronic device installing a 2nd card, and the operation of performing the linkage function can include the operations of receiving information about content related with the 2nd card from the at least one another electronic device, using the RFID module, and performing an operation for previously performing a function in which content related with the 1st card and the content related with the 2nd card are linked with each other.

The method can include the operations of performing, by the electronic device, Near Field Communication (NFC) communication connection with at least one electronic device among the at least one another electronic device, using an NFC communication module, and performing the linkage function, based at least on the operation of previously performing the linkage function.

When the content includes content related with a character, the linkage function can include a function of outputting content related with a character combining a character related with the 1st card and a character related with the 2nd card, or content including the character related with the 1st card and the character related with the 2nd card.

When the content includes content related with an instrument, the linkage function can include a function of outputting a combination of a sound source of an instrument related with the 1st card and a sound source of an instrument related with the 2nd card.

In accordance with the instant disclosure, a method for preloading content and an electronic device supporting the same can rapidly provide information to a user by previously downloading content related with an external device from a server has been described.

Also, a structure of data, as described herein, can be recorded in a non-transitory computer-readable recording medium through various devices. The non-transitory computer-readable recording medium includes a storage medium such as a magnetic storage medium (for example, a ROM, a floppy disc, a hard disc, etc.), an optical reading medium (for example, a CD-ROM, a DVD, etc.).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method for preloading content in an electronic device, the method comprising:
   receiving tag information from a plurality of tags which are within a designated distance from the electronic device, using a radio frequency identification (RFID) module;
   determining a priority order of a tag relative to the plurality of tags based on the received tag information;
   accessing, based on the tag information, an external electronic device;

downloading, from the external electronic device, content related to the tag information using a communication module based on the determined priority order of the tag;

detecting that a card comprising the tag is installed on the electronic device; and in response to detecting that the card is installed, outputting the content which is downloaded from the external electronic device.

2. The method of claim 1, wherein determining the priority order of the tag comprises determining the priority order in accordance with an intensity of a signal received from the tag or situation information of the electronic device.

3. The method of claim 1, wherein, when the tag is provided on the card that is installed in the electronic device, determining the priority order of the tag comprises determining the priority order of the tag in accordance with a degree of association of the tag with the installed card.

4. The method of claim 1, wherein, when the card that has the tag installed thereon is uninstalled from the electronic device, determining the priority order of the tag comprises determining the priority order in accordance with a degree of association of the tag with the uninstalled card.

5. The method of claim 1, further comprising while downloading the content related to the tag information, outputting representative content related to the tag information or allocating a resource for downloading the content related to the tag information in accordance with the determined priority order.

6. The method of claim 1, further comprising performing, while the electronic device is installing a first card, a linkage function with another electronic device that is installing a second card, wherein performing the linkage function comprises:
receiving information about content related with the second card from the another electronic device using the RFID module; and
performing an operation that was previously used for linking content related with the first card to the content related with the second card.

7. The method of claim 6, further comprising:
performing, by the electronic device, near field communication (NFC) communication connection with the another electronic device using an NFC communication module; and
performing the linkage function based on the previously performed linkage function.

8. The method of claim 7, wherein, when the content relates to a character, the linkage function comprises combining a character related to the first card and a character related to the second card or content comprising the character related to the first card and the character related to the second card.

9. The method of claim 7, wherein, when the content relates to an instrument, the linkage function comprises outputting a combination of a sound source of an instrument related to the first card and a sound source of an instrument related to the second card.

10. An electronic device comprising:
a communication circuit comprising a radio frequency identification (RFID) module; and
a processor configured to receive tag information from a tag from among a plurality of tags which are within a designated distance from the electronic device, using the RFID module, determine priority order one of the tag relative to the plurality of tags based on the received tag information, access, based on the tag information, an external electronic device, download, from an external device, content related to the tag information by using the communication circuit based on the determined priority order of the tag, detect that a card comprising the tag is installed on the electronic device, and in response to detecting that the card is installed, output the content which is downloaded from the external electronic device.

11. The electronic device of claim 10, wherein the processor is further configured to determine the priority order in accordance with an intensity of a signal received from the tag or situation information of the electronic device.

12. The electronic device of claim 10, wherein, when the tag is provided on the card that is installed in the electronic device, the processor is further configured to determine the priority order of the tag in accordance with a degree of association of the tag with the installed card.

13. The electronic device of claim 10, wherein, when the card that has the tag installed thereon is uninstalled from the electronic device, the processor is further configured to determine the priority order of the tag in accordance with a degree of association of the tag with the uninstalled card.

14. The electronic device of claim 10, wherein, while downloading the content related to the tag information, the processor is further configured to output representative content related to the tag information or allocate a resource for downloading the content related to the tag information in accordance with the determined priority order.

15. The electronic device of claim 10, wherein the processor is further configured to: perform, while the electronic device is installing a first card, a linkage function with another electronic device that is installing a second card,
receive information about content related to the second card from the electronic device using the RFID module in order to perform the linkage function, and
perform an operation that was previously used for linking content related with the first card to the content related with the second card.

16. The electronic device of claim 15, wherein the processor is further configured to:
perform a near field communication (NFC) communication connection with the another electronic device using an NFC communication module; and
perform the linkage function based on the previously performed linkage function.

17. The electronic device of claim 16, wherein, when the content relates to a character, the processor performs the linkage function by combining a character related to the first card and a character related to the second card or content comprising the character related to the first card and the character related to the second card.

18. The electronic device of claim 16, wherein, when the content relates to an instrument, the processor performs the linkage function by outputting a combination of a sound source of an instrument related to the first card and a sound source of an instrument related to the second card.

* * * * *